(12) United States Patent
Lin et al.

(10) Patent No.: US 12,416,784 B2
(45) Date of Patent: Sep. 16, 2025

(54) OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Meng-Kuan Cho, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 814 days.

(21) Appl. No.: 17/573,484

(22) Filed: Jan. 11, 2022

(65) Prior Publication Data

US 2023/0161136 A1 May 25, 2023

(30) Foreign Application Priority Data

Nov. 19, 2021 (TW) .................................. 110143084

(51) Int. Cl.
*G02B 9/64* (2006.01)
*G02B 13/00* (2006.01)
*G02B 13/18* (2006.01)

(52) U.S. Cl.
CPC ............... *G02B 9/64* (2013.01); *G02B 13/18* (2013.01); *G02B 13/0045* (2013.01)

(58) Field of Classification Search
CPC ...... G02B 9/64; G02B 13/0045; G02B 13/18; G02B 13/06; G03B 17/12; G03B 30/00
See application file for complete search history.

(56) References Cited

U.S. PATENT DOCUMENTS

| 3,924,934 | A | 12/1975 | Grey |
| 4,948,238 | A | 8/1990 | Araki |
| 9,961,244 | B2 | 5/2018 | Liao et al. |
| 10,935,766 | B2 | 3/2021 | Hsu et al. |

(Continued)

FOREIGN PATENT DOCUMENTS

| CN | 210015282 U | 2/2020 |
| CN | 210166555 U | 3/2020 |

(Continued)

OTHER PUBLICATIONS

European Search Report dated Jan. 24, 2023 as received in application No. 22168728.8.

*Primary Examiner* — Ricky L Mack
*Assistant Examiner* — K Muhammad
(74) *Attorney, Agent, or Firm* — Maschoff Brennan

(57) ABSTRACT

An optical lens assembly includes seven lens elements which are, in order from an object side to an image side along an optical path: a first lens element, a second lens element, a third lens element, a fourth lens element, a fifth lens element, a sixth lens element and a seventh lens element. An object-side surface of the first lens element is concave in a paraxial region thereof. The third lens element has positive refractive power. An object-side surface of the sixth lens element is convex in a paraxial region thereof, and an image-side surface of the sixth lens element is concave in a paraxial region thereof. An image-side surface of the seventh lens element is concave in a paraxial region thereof, and the image-side surface of the seventh lens element has at least one inflection point.

10 Claims, 24 Drawing Sheets

(56) References Cited

U.S. PATENT DOCUMENTS

| | | | |
|---|---|---|---|
| 2012/0044585 | A1 | 2/2012 | Yamamoto |
| 2020/0150386 | A1 | 5/2020 | Wei et al. |
| 2020/0355889 | A1 | 11/2020 | Hayashi et al. |
| 2020/0379219 | A1 | 12/2020 | Geng et al. |
| 2021/0255428 | A1 | 8/2021 | Lin et al. |
| 2021/0302694 | A1* | 9/2021 | Jhang .................. G02B 13/0045 |
| 2021/0302699 | A1 | 9/2021 | Jhang et al. |
| 2021/0373284 | A1 | 12/2021 | Wang et al. |
| 2021/0373294 | A1* | 12/2021 | Fan .......................... G02B 9/64 |
| 2022/0196982 | A1 | 6/2022 | Tukuno et al. |
| 2022/0260807 | A1 | 8/2022 | Teraoka et al. |
| 2023/0376741 | A1 | 11/2023 | Bowen et al. |

FOREIGN PATENT DOCUMENTS

| | | |
|---|---|---|
| CN | 110955027 A | 4/2020 |
| CN | 111007642 A | 4/2020 |
| CN | 111025562 A | 4/2020 |
| CN | 111025573 A | 4/2020 |
| CN | 111239975 A | 6/2020 |
| CN | 111856725 A | 10/2020 |
| CN | 111983780 A | 11/2020 |
| CN | 111983781 A | 11/2020 |
| CN | 112505899 A | 3/2021 |
| CN | 111007645 B | 7/2021 |
| CN | 113126248 A | 7/2021 |
| CN | 110927936 B | 9/2021 |
| CN | 111007646 B | 9/2021 |
| TW | I657258 B | 4/2019 |
| TW | I712816 B | 4/2019 |
| TW | 726734 B | 5/2021 |
| WO | 2021/022524 A1 | 2/2021 |
| WO | 2021128190 A1 | 7/2021 |
| WO | 2021190312 A1 | 9/2021 |
| WO | 2022174459 A1 | 8/2022 |

\* cited by examiner

OPTICAL LENS ASSEMBLY, IMAGE CAPTURING UNIT AND ELECTRONIC DEVICE

RELATED APPLICATIONS

This application claims priority to Taiwan Application 110143084, filed on Nov. 19, 2021, which is incorporated by reference herein in its entirety.

BACKGROUND

Technical Field

The present disclosure relates to an optical lens assembly, an image capturing unit and an electronic device, more particularly to an optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element is concave in a paraxial region thereof. The third lens element has positive refractive power. The object-side surface of the sixth lens element is convex in a paraxial region thereof, and the image-side surface of the sixth lens element is concave in a paraxial region thereof. The image-side surface of the seventh lens element is concave in a paraxial region thereof, and the image-side surface of the seventh lens element has at least one inflection point.

When a curvature radius of the image-side surface of the sixth lens element is R12, a curvature radius of the image-side surface of the seventh lens element is R14, an Abbe number of the fourth lens element is V4, and an Abbe number of the seventh lens element is V7, the following conditions are satisfied:

$0.45 < R12/R14 < 12$; and $1.30 < V7/V4 < 2.60$.

According to another aspect of the present disclosure, an optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element is concave in a paraxial region thereof. The third lens element has positive refractive power.

When the optical lens assembly further includes an aperture stop, a curvature radius of the object-side surface of the fifth lens element is R9, a curvature radius of the image-side surface of the sixth lens element is R12, a curvature radius of the object-side surface of the seventh lens element is R13, a curvature radius of the image-side surface of the seventh lens element is R14, a focal length of the optical lens assembly is f, a composite focal length of the first lens element and the second lens element is f12, an axial distance between the second lens element and the third lens element is T23, an axial distance between the third lens element and the fourth lens element is T34, an axial distance between the aperture stop and an image surface is SL, and a central thickness of the seventh lens element is CT7, the following conditions are satisfied:

$-0.75 < R12/R14 < 30$;

$f/f12 < -0.10$;

$0.03 < (R9+R13)/(R9-R13)$;

$1.03 < T23/T34 < 4.60$;

$1.60 < SL/f$; and $5.40 < f/CT7 < 9.50$.

According to another aspect of the present disclosure, an optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element is concave in a paraxial region thereof. The third lens element has positive refractive power. The fifth lens element has positive refractive power.

When a curvature radius of the object-side surface of the fifth lens element is R9, a curvature radius of the image-side surface of the fifth lens element is R10, a curvature radius of the object-side surface of the sixth lens element is R11, a curvature radius of the image-side surface of the sixth lens element is R12, a curvature radius of the object-side surface of the seventh lens element is R13, a curvature radius of the image-side surface of the seventh lens element is R14, a focal length of the optical lens assembly is f, a composite focal length of the fifth lens element and the sixth lens element is f56, a composite focal length of the sixth lens element and the seventh lens element is f67, an axial distance between the second lens element and the third lens element is T23, an axial distance between the third lens element and the fourth lens element is T34, and a central thickness of the seventh lens element is CT7, the following conditions are satisfied:

$-1.25 < R12/R14;$ $-1.50 < f/f56 < 0.68;$ $-0.30 < f/f67 < 1.70;$ $-0.85 < (R10+R11)/(R10-R11) < 1.25;$ $(R9+R13)/(R9-R13) < 3.00;$ $1.05 < T23/T34 < 3.70;$ and $f/CT7 < 11.5.$ According to another aspect of the present disclosure, an optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has negative refractive power, and the object-side surface of the first lens element is concave in a paraxial region thereof. The object-side surface of the second lens element is convex in a paraxial region thereof. The third lens element has positive refractive power. The object-side surface of the sixth lens element is convex in a paraxial region thereof, and the image-side surface of the sixth lens element is concave in a paraxial region thereof. The object-side surface of the seventh lens element is convex in a paraxial region thereof, the image-side surface of the seventh lens element is concave in a paraxial region thereof, and the image-side surface of the seventh lens element has at least one inflection point.

When a curvature radius of the object-side surface of the first lens element is R1, a curvature radius of the image-side surface of the first lens element is R2, a curvature radius of the object-side surface of the second lens element is R3, a focal length of the optical lens assembly is f, a focal length of the first lens element is f1, a focal length of the seventh lens element is f7, a central thickness of the fifth lens element is CT5, an axial distance between the fourth lens element and the fifth lens element is T45, an axial distance between the object-side surface of the first lens element and an image surface is TL, and a maximum image height of the optical lens assembly is ImgH, the following conditions are satisfied:

$(R1+R2)/(R1-R2) < 0;$ $-0.50 < f/f7 < 0.60;$ $0.50 < CT5/T45 < 7.50;$ $-3.00 < f/f1 < -0.10;$ $0.50 < f/R3 < 1.90;$ and $TL/ImgH < 2.00.$ According to another aspect of the present disclosure, an image capturing unit includes one of the aforementioned optical lens assemblies and an image sensor, wherein the image sensor is disposed on an image surface of the optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
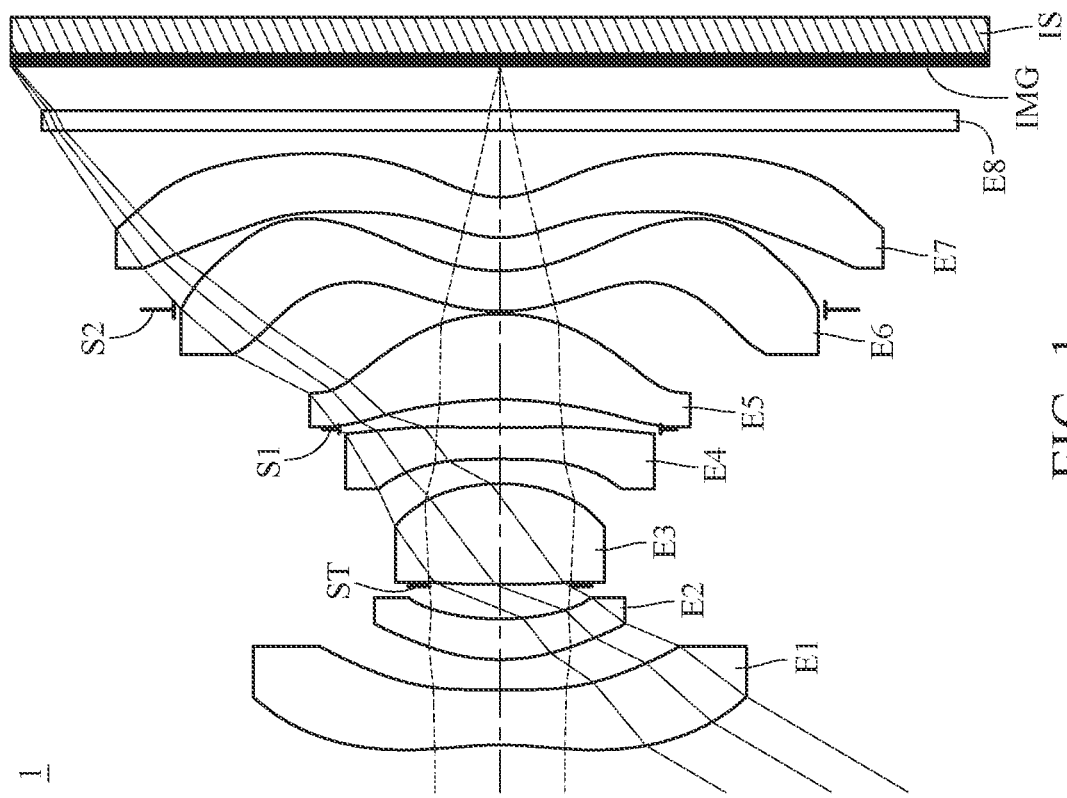
FIG. 1 is a schematic view of an image capturing unit according to the 1st embodiment of the present disclosure.

An optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element can have negative refractive power. Therefore, it is favorable for increasing the field of view and reducing the maximum effective radius of the first lens element. The object-side surface of the first lens element is concave in a paraxial region thereof. Therefore, it is favorable for adjusting the focal length of the first lens element, thereby reducing the central thickness of the first lens element.

The object-side surface of the second lens element can be convex in a paraxial region thereof. Therefore, it is favorable for combining the second lens element with the first lens element, thereby increasing the field of view and reducing distortion.

The third lens element has positive refractive power. Therefore, it is favorable for combining the third lens element with the fourth lens element so as to correct aberrations such as spherical aberration. The object-side surface of the third lens element can be convex in a paraxial region thereof. Therefore, it is favorable for adjusting the lens shape of the third lens element so as to refract light with a relatively large field of view and reduce the maximum effective radius thereof.

The fifth lens element can have positive refractive power. Therefore, it is favorable for adjusting the refractive power configuration of the optical lens assembly, thereby obtaining a balance between the field of view and the size distribution. The object-side surface of the fifth lens element can be concave in a paraxial region thereof. Therefore, it is favorable for adjusting the overall focal length of the fourth lens element and the fifth lens element, thereby ensuring focusing quality at the central optical path. The image-side surface of the fifth lens element can be convex in a paraxial region thereof. Therefore, it is favorable for combining the fifth lens element with the sixth lens element so as to reduce the back focal length.

The object-side surface of the sixth lens element can be convex in a paraxial region thereof. Therefore, it is favorable for adjusting the lens shape of the sixth lens element, thereby reducing coma of the field of view adjacent to the central optical path. The image-side surface of the sixth lens element can be concave in a paraxial region thereof. Therefore, it is favorable for adjusting the traveling direction of light, thereby collaborating the light angle and the image sensor and obtaining good image quality.

The object-side surface of the seventh lens element can be convex in a paraxial region thereof. Therefore, it is favorable for adjusting the lens shape of the seventh lens element, thereby reducing chromatic aberration at the central field of view. The image-side surface of the seventh lens element can be concave in a paraxial region thereof. Therefore, it is favorable for adjusting the lens shape of the seventh lens element, thereby reducing the back focal length and the total track length of the optical lens assembly.

The object-side surface of the first lens element can have at least one inflection point. Therefore, it is favorable for preventing an overly large maximum effective radius of the first lens element so as to effectively control the lens size. The image-side surface of the seventh lens element can have at least one inflection point. Therefore, it is favorable for correcting distortion at the peripheral field of view. Please note that the abovementioned inflection points on the first and seventh lens elements are only exemplary. Each of lens surfaces in various embodiments of the present disclosure may also have one or more inflection points. Please refer to FIG. 21, which shows a schematic view of inflection points P on the object-side surfaces and the image-side surfaces of lens elements of the optical lens assembly according to the 1st embodiment of the present disclosure.

Figure 21:
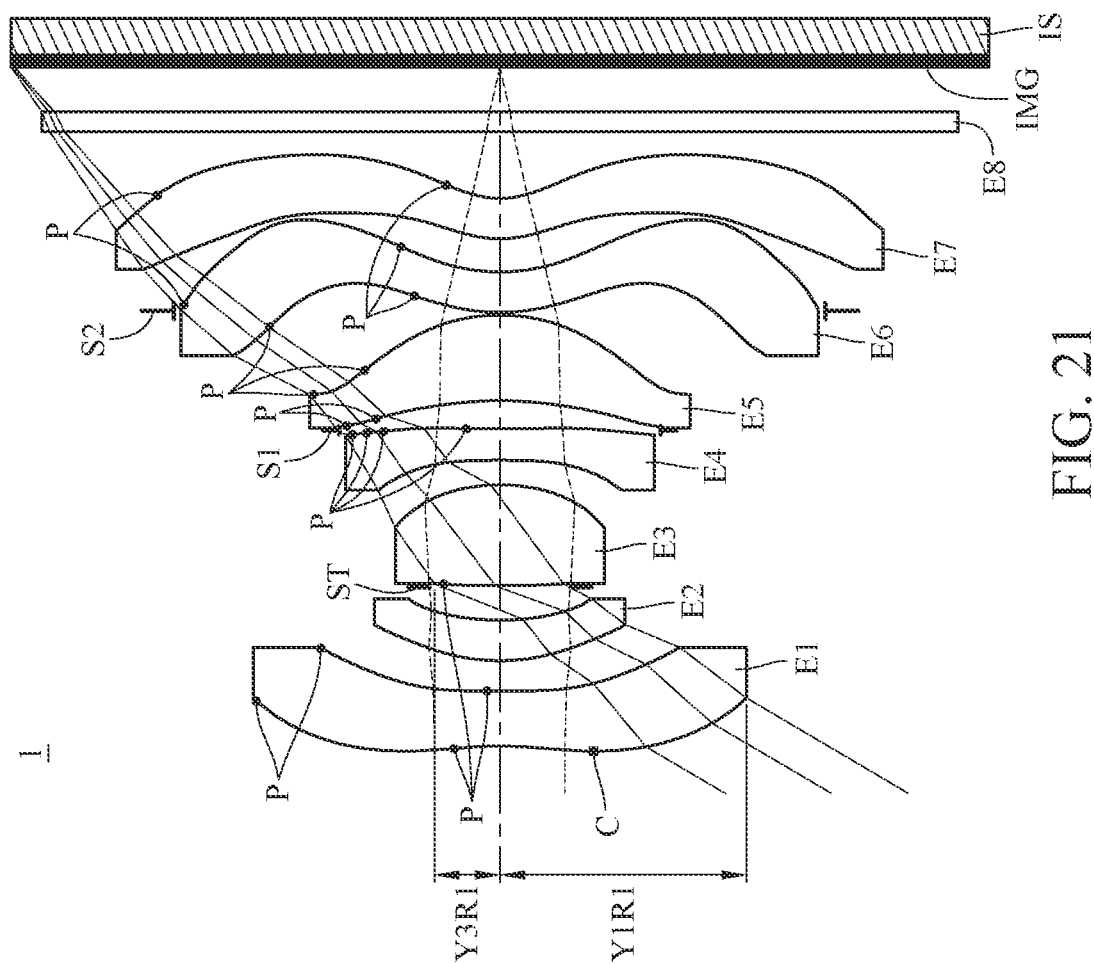
FIG. 21 shows a schematic view of Y1 R1, Y3R1 and inflection points and several critical points of lens elements according to the 1st embodiment of the present disclosure.

The object-side surface of the first lens element can have at least one critical point in an off-axis region thereof. Therefore, it is favorable for controlling the aperture size of the lens so as to meet the design requirements of an electronic device. Please refer to FIG. 21, which shows a schematic view of a critical point C in an off-axis region of the object-side surface of the first lens element E1 according to the 1st embodiment of the present disclosure. The abovementioned critical point on the first lens element in FIG. 21 is only exemplary. Each of lens surfaces in various embodiments of the present disclosure may also have one or more non-axial critical points.

When a curvature radius of the image-side surface of the sixth lens element is R12, and a curvature radius of the image-side surface of the seventh lens element is R14, the following condition is satisfied: −1.25<R12/R14. Therefore, it is favorable for adjusting a ratio of the curvature radius of the image-side surface of the sixth lens element to the curvature radius of the image-side surface of the seventh lens element, thereby reducing spherical aberration at center of the field of view. Moreover, the following condition can also be satisfied: −0.75<R12/R14<30. Moreover, the following condition can also be satisfied: 0.45<R12/R14<12. Moreover, the following condition can also be satisfied: 0.70<R12/R14<11.

When an Abbe number of the fourth lens element is V4, and an Abbe number of the seventh lens element is V7, the following condition can be satisfied: 1.30<V7/V4<2.60. Therefore, it is favorable for adjusting a ratio of the Abbe number of the fourth lens element to the Abbe number of the seventh lens element so as to reduce chromatic aberration at various fields of view. Moreover, the following condition can also be satisfied: 1.35<V7/V4<2.50.

When a focal length of the optical lens assembly is f, and a composite focal length of the first lens element and the second lens element is f12, the following condition can be satisfied: f/f12<−0.10. Therefore, it is favorable for adjusting the overall refractive power from the first lens element to the second lens element, thereby obtaining a proper balance between viewing angle increase and the total track length of the optical lens assembly. Moreover, the following condition can also be satisfied: f/f12<−0.13. Moreover, the following condition can also be satisfied: −0.49<f/f12. Moreover, the following condition can also be satisfied: −0.49<f/f12<−0.10.

When a curvature radius of the object-side surface of the fifth lens element is R9, and a curvature radius of the object-side surface of the seventh lens element is R13, the following condition can be satisfied: 0.03<(R9+R13)/(R9−R13). Therefore, it is favorable for adjusting the lens shapes and the refractive powers of the fifth and seventh lens elements, thereby increasing convergence quality. Moreover, the following condition can also be satisfied: 0.15<(R9+R13)/(R9−R13). Moreover, the following condition can also be satisfied: (R9+R13)/(R9−R13)<3.00. Moreover, the following condition can also be satisfied: (R9+R13)/(R9−R13)<2.00. Moreover, the following condition can also be satisfied: 0.20<(R9+R13)/(R9−R13)<4.00.

When an axial distance between the second lens element and the third lens element is T23, and an axial distance between the third lens element and the fourth lens element is T34, the following condition can be satisfied: 1.03<T23/T34<4.60. Therefore, it is favorable for adjusting the ratio of the axial distance between the second and third lens elements to the axial distance between the third and fourth lens elements, thereby reducing the maximum effective radius of the second lens element and increasing the field of view. Moreover, the following condition can also be satisfied: 1.15<T23/T34<4.30. Moreover, the following condition can also be satisfied: 1.05<T23/T34<3.70. Moreover, the following condition can also be satisfied: 1.20<T23/T34<3.50.

According to the present disclosure, the optical lens assembly can further include an aperture stop. When an axial distance between the aperture stop and an image surface is SL, and the focal length of the optical lens assembly is f, the following condition can be satisfied: 1.60<SL/f. Therefore, it is favorable for adjusting the axial distance between the aperture stop and the image surface, thereby reducing the total track length and increasing the field of view. Moreover, the following condition can also be satisfied: 1.65<SL/f. Moreover, the following condition can also be satisfied: 1.60<SL/f<2.70. Moreover, the following condition can also be satisfied: 1.60<SL/f<2.50.

When the focal length of the optical lens assembly is f, and a central thickness of the seventh lens element is CT7, the following condition can be satisfied: f/CT7<11.5. Therefore, it is favorable for adjusting the ratio of the focal length to the central thickness of the seventh lens element, thereby reducing spherical aberration at center of the field of view. Moreover, the following condition can also be satisfied: f/CT7<9.50. Moreover, the following condition can also be satisfied: 5.40<f/CT7<9.50. Moreover, the following condition can also be satisfied: 5.60<f/CT7<9.20.

When the focal length of the optical lens assembly is f, and a composite focal length of the fifth lens element and the sixth lens element is f56, the following condition can be satisfied: f/f56<0.60. Therefore, it is favorable for adjusting overall refractive power from the fifth lens element to the sixth lens element, thereby correcting astigmatism of aberrations. Moreover, the following condition can also be satisfied: −1.50<f/f56<0.68. Moreover, the following condition can also be satisfied: −1.20<f/f56<0.55. Moreover, the following condition can also be satisfied: −0.50<f/f56<0.60.

When the focal length of the optical lens assembly is f, and a composite focal length of the sixth lens element and the seventh lens element is f67, the following condition can be satisfied: −0.30<f/f67. Therefore, it is favorable for adjusting overall refractive power from the sixth lens element and the seventh lens element, thereby adjusting the back focal length. Moreover, the following condition can also be satisfied: −0.30<f/f67<1.70. Moreover, the following condition can also be satisfied: −0.25<f/f67<1.40.

When a curvature radius of the image-side surface of the fifth lens element is R10, and a curvature radius of the object-side surface of the sixth lens element is R11, the following condition can be satisfied: −0.85<(R10+R11)/(R10−R11)<1.25. Therefore, it is favorable for adjusting the lens shape and the refractive power of the fifth lens element so as to correct chromatic aberration at center of the field of view. Moreover, the following condition can also be satisfied: −0.75<(R10+R11)/(R10−R11)<1.10. Moreover, the following condition can also be satisfied: −0.40<(R10+R11)/(R10−R11)<0.80.

When a curvature radius of the object-side surface of the first lens element is R1, and a curvature radius of the image-side surface of the first lens element is R2, the following condition can be satisfied: (R1+R2)/(R1−R2)<0. Therefore, it is favorable for adjusting the lens shape and the refractive power of the first lens element, thereby obtaining a proper balance between the axial distance from the first lens element to the aperture stop and the field of view. Moreover, the following condition can also be satisfied: −2.50<(R1+R2)/(R1−R2)<0.60. Moreover, the following condition can also be satisfied: −2.00<(R1+R2)/(R1−R2)<−0.10.

When the focal length of the optical lens assembly is f, and a focal length of the seventh lens element is f7, the following condition can be satisfied: −0.50<f/f7<0.60. Therefore, it is favorable for adjusting the refractive power of the seventh lens element, thereby increasing light-blocking quality at center of the field of view and reducing back focal length.

When a central thickness of the fifth lens element is CT5, and an axial distance between the fourth lens element and the fifth lens element is T45, the following condition can be satisfied: 0.50<CT5/T45<7.50. Therefore, it is favorable for adjusting the ratio of the central thickness of the fifth lens element and the axial distance between the fourth lens element and the fifth lens element so as to properly configure the location of the fifth lens element, thereby increasing convergence quality at center of the field of view and reducing assembly error.

When the focal length of the optical lens assembly is f, and the focal length of the first lens element is f1, the following condition can be satisfied: −3.00<f/f1<−0.10. Therefore, it is favorable for adjusting the refractive power of the first lens element, thereby increasing the field of view and reducing the maximum effective radius of the first lens element. Moreover, the following condition can also be satisfied: −1.00<f/f1<−0.20.

When the focal length of the optical lens assembly is f, and a curvature radius of the object-side surface of the second lens element is R3, the following condition can be satisfied: 0.50<f/R3<1.90. Therefore, it is favorable for adjusting the ratio of the focal length to the curvature radius of the object-side surface of the second lens element, thereby obtaining a proper balance between lens manufacturing yield rate and convergence quality at center of the field of view.

When an axial distance between the object-side surface of the first lens element and the image surface is TL, and a maximum image height of the optical lens assembly (which can be half of a diagonal length of an effective photosensitive area of an image sensor) is ImgH, the following condition can be satisfied: TL/ImgH<2.00. Therefore, it is favorable for adjusting the ratio of the total track length to the maximum image height, thereby obtaining a proper balance between the maximum image height and the field of view. Moreover, the following condition can also be satisfied: 0.80<TL/ImgH<1.60.

When the focal length of the optical lens assembly is f, an axial distance between the first lens element and the second lens element is T12, and the axial distance between the second lens element and the third lens element is T23, the following condition can be satisfied: 2.50<f/(T12+T23)<14.00. Therefore, it is favorable for adjusting the lens distribution from the first lens element to the third lens element, thereby increasing assembly yield rate. Moreover, the following condition can also be satisfied: $2.50<f/(T12+T23)<10.0$.

When the curvature radius of the object-side surface of the first lens element is R1, and the curvature radius of the object-side surface of the seventh lens element is R13, the following condition can be satisfied: $-0.50<(R1+R13)/(R1-R13)<2.50$. Therefore, it is favorable for adjusting the lens shapes and the refractive powers of the first and seventh lens elements, thereby reducing manufacturing cost of the first and seventh lens elements. Moreover, the following condition can also be satisfied: $-0.10<(R1+R13)/(R1-R13)<1.50$. Moreover, the following condition can also be satisfied: $0.10<(R1+R13)/(R1-R13)<1.00$.

When a refractive index of the fourth lens element is N4, and a refractive index of the sixth lens element is N6, the following condition can be satisfied: $1.60<(N4+N6)/2<1.85$. Therefore, it is favorable for adjusting the average value of the refractive indices of the fourth and sixth lens elements, thereby increasing the maximum image height and the field of view.

When the maximum effective radius of the object-side surface of the first lens element is Y1 R1, and the maximum effective radius of the object-side surface of the third lens element is Y3R1, the following condition can be satisfied: $2.75<Y1\ R1/Y3R1<4.70$. Therefore, it is favorable for adjusting the ratio of the maximum effective radii of the first and third lens elements, thereby obtaining a proper balance between size and maximum image height reduction and mechanism design difficulty reduction. Please refer to FIG. 21, which shows a schematic view of Y1 R1 and Y3R1 according to the 1st embodiment of the present disclosure.

When a central thickness of the third lens element is CT3, and an axial distance between the fifth lens element and the sixth lens element is T56, the following condition can be satisfied: $15.0<CT3/T56<40.0$. Therefore, it is favorable for adjusting the central thickness of the third lens element and the axial distance between the fifth and sixth lens elements, thereby increasing maximum image height and reducing the total track length of the optical lens assembly. Moreover, the following condition can also be satisfied: $20.0<CT3/T56<40.0$. Moreover, the following condition can also be satisfied: $29.0<CT3/T56<40.0$.

When the focal length of the optical lens assembly is f, and a central thickness of the second lens element is CT2, the following condition can be satisfied: $5.90<f/CT2<11.00$. Therefore, it is favorable for adjusting the ratio of the focal length to the central thickness of the second lens element, thereby increasing the field of view. Moreover, the following condition can also be satisfied: $5.90<f/CT2<9.00$.

When the focal length of the optical lens assembly is f, the central thickness of the first lens element is CT1, and the central thickness of the second lens element is CT2, the following condition can be satisfied: $1.50<f/(CT1+CT2)<4.50$. Therefore, it is favorable for adjusting the ratio of the focal length to the sum of the central thicknesses of the first and second lens elements, thereby obtaining a proper balance between manufacturing difficulty and the total track length of the lens.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the axial distance between the fifth lens element and the sixth lens element is T56, and an axial distance between the sixth lens element and the seventh lens element is T67, the following condition can be satisfied: $0.55<(T12+T23)/(T34+T45+T56+T67)<1.50$. Therefore, it is favorable for adjusting the ratio of the axial distance between the first lens element and the third lens element to the axial distance between the third lens element and the seventh lens element, thereby balancing the total track length, the field of view and the maximum image height.

When the axial distance between the first lens element and the second lens element is T12, the axial distance between the second lens element and the third lens element is T23, and a sum of axial distances between each of all adjacent lens elements of the optical lens assembly is $\Sigma AT$, the following condition can be satisfied: $0.30<(T12+T23)/\Sigma AT<0.70$. Therefore, it is favorable for adjusting the ratio of the axial distance between the first lens element and the third lens element to the sum of axial distances between each of all adjacent lens elements of the optical lens assembly, thereby balancing the distribution of the lens elements and reducing impact during assembly.

When half of a maximum field of view of the optical lens assembly is HFOV, the following condition can be satisfied: $59.0\ [\deg.]<HFOV<73.0\ [\deg.]$. Therefore, it is favorable for adjusting the field of view, thereby obtaining a relatively wide imaging range.

When a refractive index of the second lens element is N2, and the refractive index of the fourth lens element is N4, the following condition can be satisfied: $1.60<(N2+N4)/2<1.72$. Therefore, it is favorable for adjusting the average value of refractive indices of the second and fourth lens elements, thereby reducing the maximum effective radius of the first to the fourth lens elements so as to reduce mechanism design difficulty.

When an Abbe number of the first lens element is V1, an Abbe number of the second lens element is V2, an Abbe number of the third lens element is V3, the Abbe number of the fourth lens element is V4, an Abbe number of the fifth lens element is V5, an Abbe number of the sixth lens element is V6, the Abbe number of the seventh lens element is V7, an Abbe number of the i-th lens element is Vi, a refractive index of the first lens element is N1, the refractive index of the second lens element is N2, a refractive index of the third lens element is N3, the refractive index of the fourth lens element is N4, a refractive index of the fifth lens element is N5, the refractive index of the sixth lens element is N6, a refractive index of the seventh lens element is N7, and a refractive index of the i-th lens element is Ni, at least one lens element of the optical lens assembly can satisfy the following condition: $5.0<Vi/Ni<11.9$, wherein i=1, 2, 3, 4, 5, 6 or 7. Therefore, it is favorable for correcting chromatic aberration at the peripheral field of view and increasing image size.

When a maximum value among central thicknesses of all lens elements of the optical lens assembly is CT_MAX, and the focal length of the optical lens assembly is f, the following condition can be satisfied: $0.30<CT\_MAX/f<0.50$. Therefore, it is favorable for adjusting the ratio of the focal length to the largest axial distance, thereby balancing the largest axial distance ratio and reducing assembly error.

According to the present disclosure, the aforementioned features and conditions can be utilized in numerous combinations so as to achieve corresponding effects.

According to the present disclosure, the lens elements of the optical lens assembly can be made of either glass or plastic material. When the lens elements are made of glass material, the refractive power distribution of the optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical lens assembly, based on the corresponding image sensor, can be flat or curved, especially a curved surface being concave facing towards the object side of the optical lens assembly.

According to the present disclosure, an image correction unit, such as a field flattener, can be optionally disposed between the lens element closest to the image side of the optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 22:
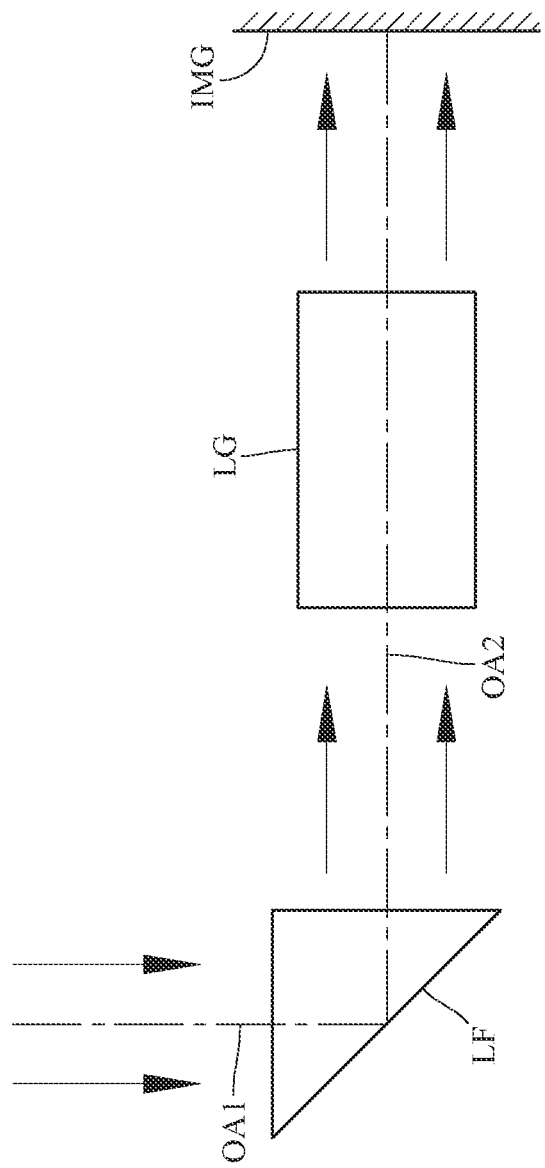
FIG. 22 shows a schematic view of a configuration of a light-folding element in an optical lens assembly according to one embodiment of the present disclosure.
Figure 23:
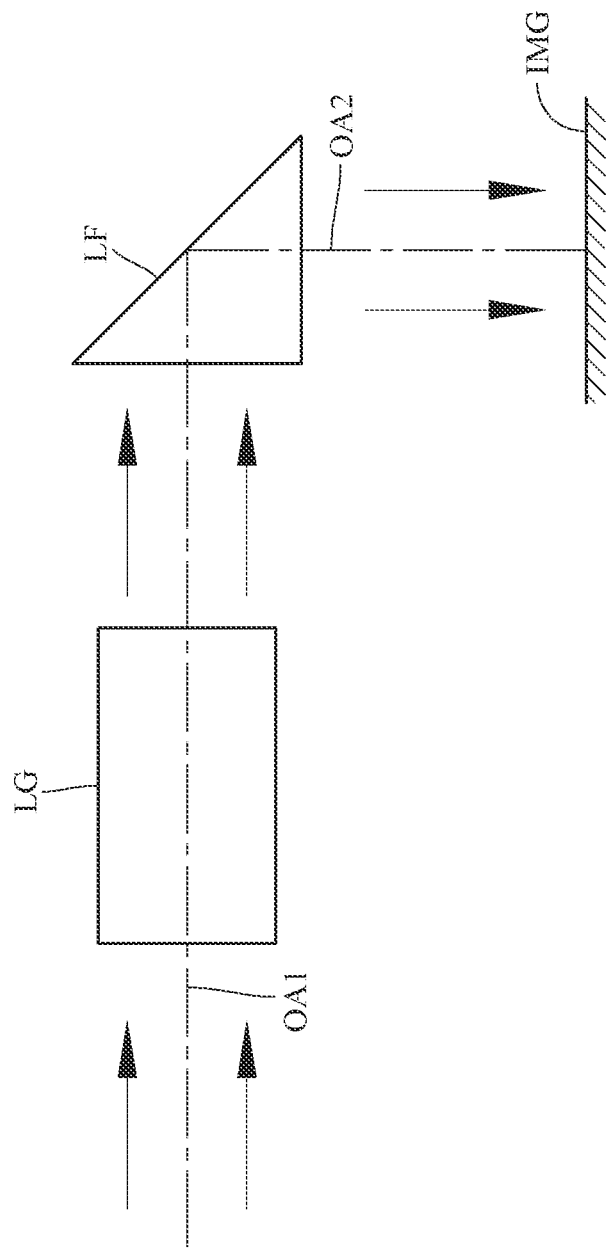
FIG. 23 shows a schematic view of another configuration of a light-folding element in an optical lens assembly according to one embodiment of the present disclosure.
Figure 24:
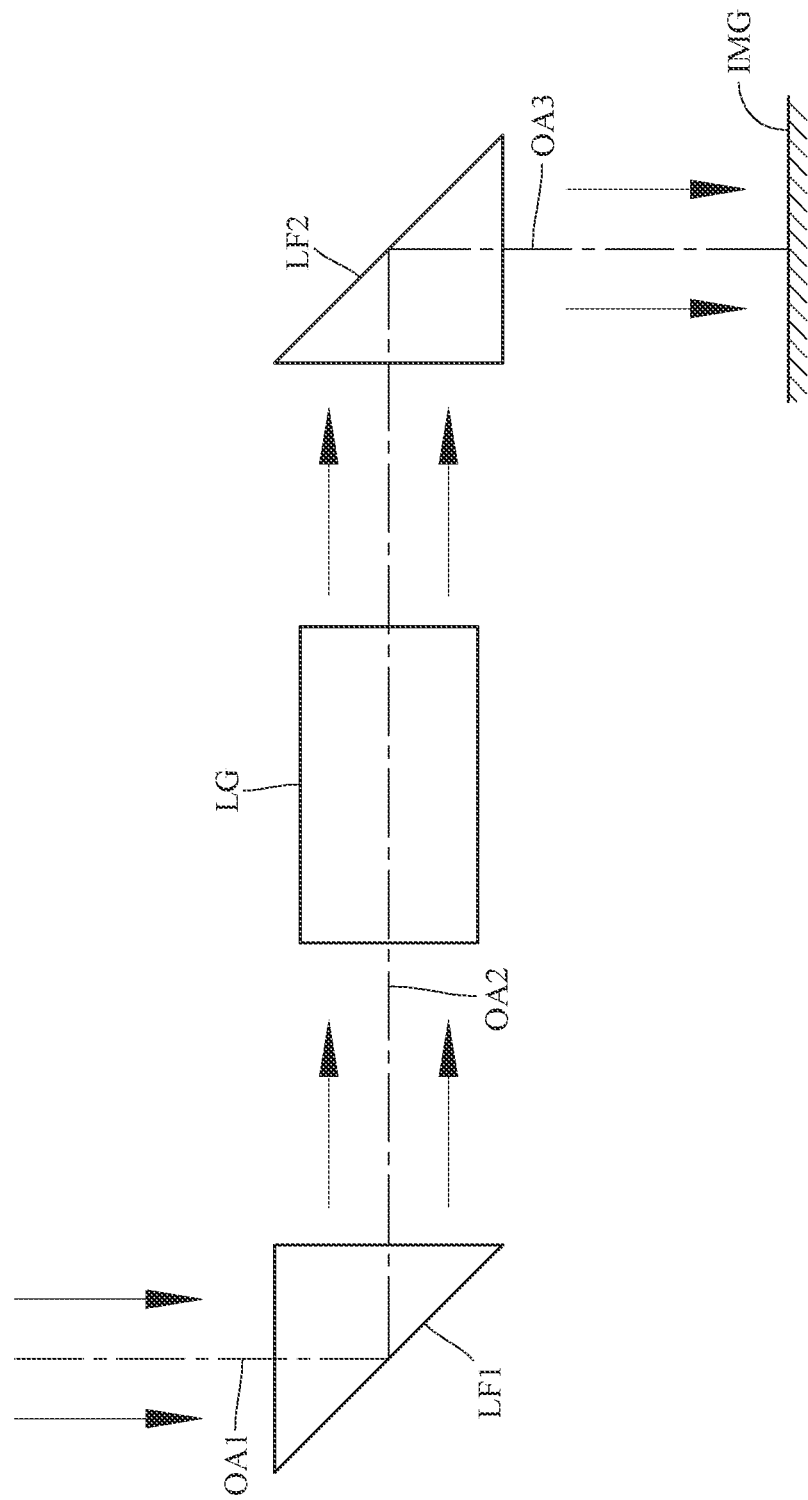
FIG. 24 shows a schematic view of a configuration of two light-folding elements in an optical lens assembly according to one embodiment of the present disclosure.

According to the present disclosure, at least one light-folding element, such as a prism or a mirror, can be optionally disposed between an imaged object and the image surface on the imaging optical path, such that the optical lens assembly can be more flexible in space arrangement, and therefore the dimensions of an electronic device is not restricted by the total track length of the optical lens assembly. Specifically, please refer to FIG. 22 and FIG. 23. FIG. 22 shows a schematic view of a configuration of a light-folding element in an optical lens assembly according to one embodiment of the present disclosure, and FIG. 23 shows a schematic view of another configuration of a light-folding element in an optical lens assembly according to one embodiment of the present disclosure. In FIG. 22 and FIG. 23, the optical lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical lens assembly as shown in FIG. 22 or disposed between a lens group LG of the optical lens assembly and the image surface IMG as shown in FIG. 23. Furthermore, please refer to FIG. 24, which shows a schematic view of a configuration of two light-folding elements in an optical lens assembly according to one embodiment of the present disclosure. In FIG. 24, the optical lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical lens assembly, the second light-folding element LF2 is disposed between the lens group LG of the optical lens assembly and the image surface IMG, and the travelling direction of light on the first optical axis OA1 can be the same direction as the travelling direction of light on the third optical axis OA3 as shown in FIG. 24. The optical lens assembly can be optionally provided with three or more light-folding elements, and the present disclosure is not limited to the type, amount and position of the light-folding elements of the embodiments disclosed in the aforementioned figures.

According to the present disclosure, the optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical lens assembly and thereby provides a wider field of view for the same.

According to the present disclosure, the optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
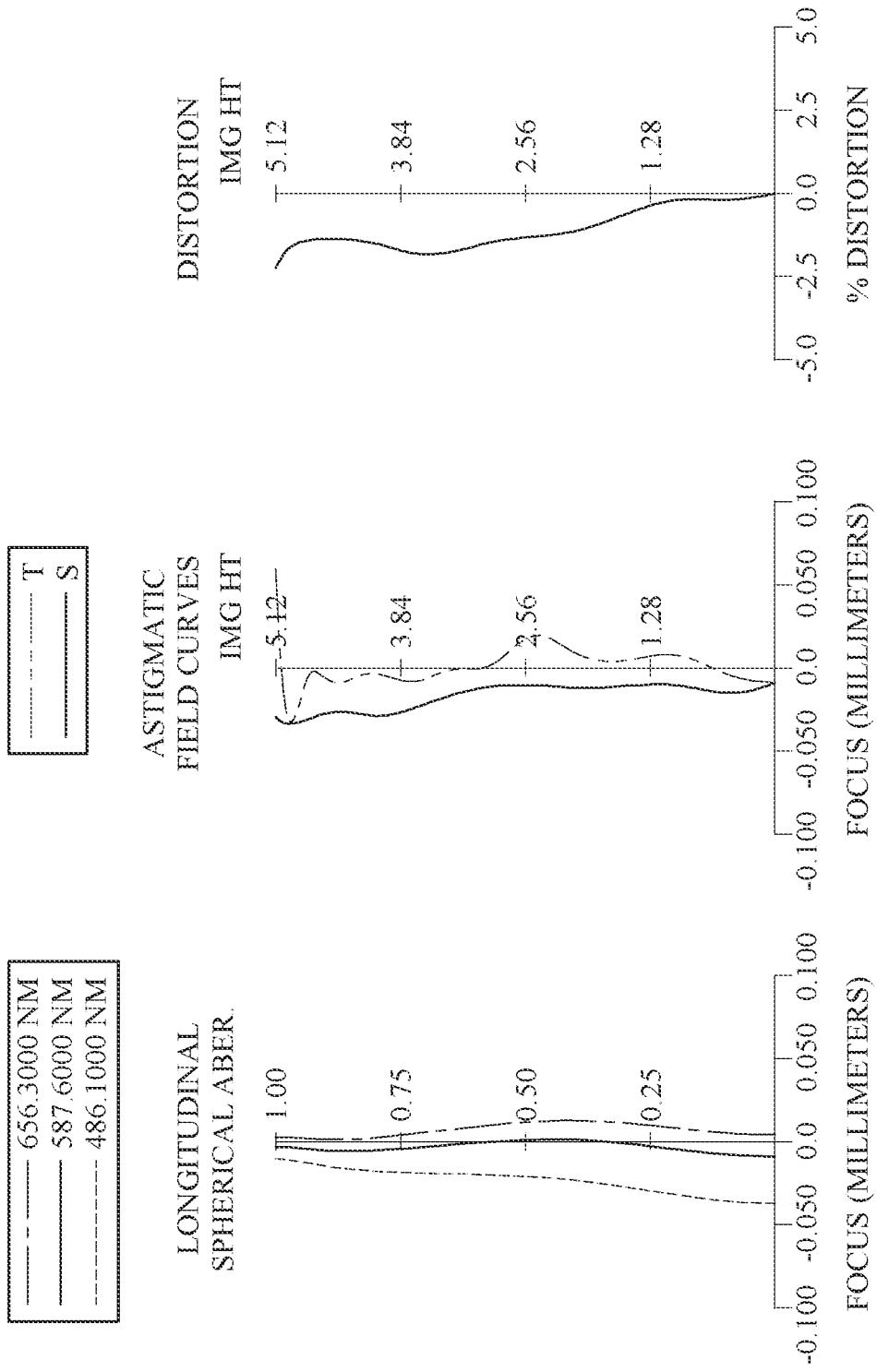
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a stop S2, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has four inflection points. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has two inflection points. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has four inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The equation of the aspheric surface profiles of the aforementioned lens elements of the 1st embodiment is expressed as follows:

$$X(Y) = (Y^2/R) / (1 + sqrt(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18, 20, 22, 24, 26, 28 and 30.

In the optical lens assembly of the image capturing unit according to the 1st embodiment, when a focal length of the optical lens assembly is f, an f-number of the optical lens assembly is Fno, and half of a maximum field of view of the optical lens assembly is HFOV, these parameters have the following values: f=3.08 millimeters (mm), Fno=2.25, HFOV=59.52 degrees (deg.).

When a maximum value among central thicknesses of all lens elements of the optical lens assembly is CT_MAX, and the focal length of the optical lens assembly is f, the following condition is satisfied: CT_MAX/f=0.34. In this embodiment, among the first through seventh lens elements (E1-E7), a central thickness of the third lens element E3 is larger than central thicknesses of the other lens elements of the optical lens assembly, and CT_MAX is equal to the central thickness of the third lens element E3.

When the central thickness of the third lens element E3 is CT3, and an axial distance between the fifth lens element E5 and the sixth lens element E6 is T56, the following condition is satisfied: CT3/T56=35.40. In this embodiment, an axial distance between two adjacent lens elements is a distance in a paraxial region between two adjacent lens surfaces of the two adjacent lens elements.

When the focal length of the optical lens assembly is f, a central thickness of the first lens element E1 is CT1, and a central thickness of the second lens element E2 is CT2, the following condition is satisfied: f/(CT1+CT2)=3.05.

When the focal length of the optical lens assembly is f, and the central thickness of the second lens element E2 is CT2, the following condition is satisfied: f/CT2=7.21.

When a central thickness of the fifth lens element E5 is CT5, and an axial distance between the fourth lens element E4 and the fifth lens element E5 is T45, the following condition is satisfied: CT5/T45=3.01.

When the focal length of the optical lens assembly is f, and a central thickness of the seventh lens element E7 is CT7, the following condition is satisfied: f/CT7=7.24.

When the focal length of the optical lens assembly is f, and a composite focal length of the first lens element E1 and the second lens element E2 is f12, the following condition is satisfied: f/f12=−0.16.

When the focal length of the optical lens assembly is f, and a composite focal length of the fifth lens element E5 and the sixth lens element E6 is f56, the following condition is satisfied: f/f56=0.45.

When the focal length of the optical lens assembly is f, and a composite focal length of the sixth lens element E6 and the seventh lens element E7 is f67, the following condition is satisfied: f/f67=−0.11.

When the focal length of the optical lens assembly is f, and a focal length of the first lens element E1 is f1, the following condition is satisfied: f/f1=−0.39.

When the focal length of the optical lens assembly is f, and a focal length of the seventh lens element E7 is f7, the following condition is satisfied: f/f7=−0.16.

When the focal length of the optical lens assembly is f, and a curvature radius of the object-side surface of the second lens element E2 is R3, the following condition is satisfied: f/R3=1.39.

When the focal length of the optical lens assembly is f, an axial distance between the first lens element E1 and the second lens element E2 is T12, and an axial distance between the second lens element E2 and the third lens element E3 is T23, the following condition is satisfied: f/(T12+T23)=4.54.

When a refractive index of the second lens element E2 is N2, and a refractive index of the fourth lens element E4 is N4, the following condition is satisfied: (N2+N4)/2=1.65.

When the refractive index of the fourth lens element E4 is N4, and a refractive index of the sixth lens element E6 is N6, the following condition is satisfied: (N4+N6)/2=1.62.

When a curvature radius of the object-side surface of the first lens element E1 is R1, and a curvature radius of the object-side surface of the seventh lens element E7 is R13, the following condition is satisfied: (R1+R13)/(R1−R13)=0.53.

When the curvature radius of the object-side surface of the first lens element E1 is R1, and a curvature radius of the image-side surface of the first lens element E1 is R2, the following condition is satisfied: (R1+R2)/(R1−R2)=−1.33.

When a curvature radius of the image-side surface of the fifth lens element E5 is R10, and a curvature radius of the object-side surface of the sixth lens element E6 is R11, the following condition is satisfied: (R10+R11)/(R10−R11)=0.03.

When a curvature radius of the image-side surface of the sixth lens element E6 is R12, and a curvature radius of the image-side surface of the seventh lens element E7 is R14, the following condition is satisfied: R12/R14=2.16.

When a curvature radius of the object-side surface of the fifth lens element E5 is R9, and the curvature radius of the object-side surface of the seventh lens element E7 is R13, the following condition is satisfied: (R9+R13)/(R9−R13)=0.51.

When the axial distance between the first lens element E1 and the second lens element E2 is T12, the axial distance between the second lens element E2 and the third lens element E3 is T23, and a sum of axial distances between each of all adjacent lens elements of the optical lens assembly is ΣAT, the following condition is satisfied: (T12+T23)/ΣAT=0.42. In this embodiment, ΣAT is a sum of axial distances between the first lens element E1 and the second lens element E2, the second lens element E2 and the third lens element E3, the third lens element E3 and the fourth lens element E4, the fourth lens element E4 and the fifth lens element E5, the fifth lens element E5 and the sixth lens element E6, and the sixth lens element E6 and the seventh lens element E7.

When the axial distance between the first lens element E1 and the second lens element E2 is T12, the axial distance between the second lens element E2 and the third lens element E3 is T23, an axial distance between the third lens element E3 and the fourth lens element E4 is T34, the axial distance between the fourth lens element E4 and the fifth lens element E5 is T45, the axial distance between the fifth lens element E5 and the sixth lens element E6 is T56, and an axial distance between the sixth lens element E6 and the seventh lens element E7 is T67, the following condition is satisfied: (T12+T23)/(T34+T45+T56+T67)=0.72.

When the axial distance between the second lens element E2 and the third lens element E3 is T23, and the axial distance between the third lens element E3 and the fourth lens element E4 is T34, the following condition is satisfied: T23/T34=1.39.

When an axial distance between the object-side surface of the first lens element E1 and the image surface IMG is TL, and a maximum image height of the optical lens assembly is ImgH, the following condition is satisfied: TL/ImgH=1.40.

When an axial distance between the aperture stop ST and the image surface IMG is SL, and the focal length of the optical lens assembly is f, the following condition is satisfied: SL/f=1.78.

When an Abbe number of the fourth lens element E4 is V4, and an Abbe number of the seventh lens element E7 is V7, the following condition is satisfied: V7/V4=2.04.

When an Abbe number of the first lens element E1 is V1, an Abbe number of the second lens element E2 is V2, an Abbe number of the third lens element E3 is V3, the Abbe number of the fourth lens element E4 is V4, an Abbe number of the fifth lens element E5 is V5, an Abbe number of the sixth lens element E6 is V6, the Abbe number of the seventh lens element E7 is V7, a refractive index of the first lens element E1 is N1, the refractive index of the second lens element E2 is N2, a refractive index of the third lens element E3 is N3, the refractive index of the fourth lens element E4 is N4, a refractive index of the fifth lens element E5 is N5, the refractive index of the sixth lens element E6 is N6, and a refractive index of the seventh lens element E7 is N7, the following conditions are satisfied: V1/N1=36.30; V2/N2=15.85; V3/N3=36.26; V4/N4=10.90; V5/N5=36.26; V6/N6=36.26; and V7/N7=23.91.

When a maximum effective radius of the object-side surface of the first lens element E1 is Y1R1, and a maximum effective radius of the object-side surface of the third lens element E3 is Y3R1, the following condition is satisfied: Y1R1/Y3R1=3.47.

The detailed optical data of the 1st embodiment are shown in Table 1 and the aspheric surface data are shown in Table 2 below.

TABLE 1

1st Embodiment
f = 3.08 mm, Fno = 2.25, HFOV = 59.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.7029 (ASP) | 0.583 | Plastic | 1.545 | 56.1 | −7.99 |
| 2 | | −26.1414 (ASP) | 0.317 | | | | |
| 3 | Lens 2 | 2.2136 (ASP) | 0.427 | Plastic | 1.614 | 25.6 | 13.49 |
| 4 | | 2.7991 (ASP) | 0.344 | | | | |
| 5 | Ape. Stop | Plano | 0.017 | | | | |
| 6 | Lens 3 | 8.5730 (ASP) | 1.062 | Plastic | 1.544 | 56.0 | 3.19 |
| 7 | | −2.0827 (ASP) | 0.259 | | | | |
| 8 | Lens 4 | −21.7059 (ASP) | 0.330 | Plastic | 1.686 | 18.4 | −9.47 |
| 9 | | 9.3342 (ASP) | −0.014 | | | | |
| 10 | Stop | Plano | 0.313 | | | | |
| 11 | Lens 5 | −3.5425 (ASP) | 0.899 | Plastic | 1.544 | 56.0 | 7.92 |
| 12 | | −2.1184 (ASP) | 0.030 | | | | |
| 13 | Lens 6 | 2.0059 (ASP) | 0.425 | Plastic | 1.544 | 56.0 | 103.09 |
| 14 | | 1.9250 (ASP) | −0.410 | | | | |
| 15 | Stop | Plano | 0.760 | | | | |
| 16 | Lens 7 | 1.1407 (ASP) | 0.425 | Plastic | 1.566 | 37.4 | −19.13 |
| 17 | | 0.8930 (ASP) | 0.700 | | | | |
| 18 | Filter | Plano | 0.210 | Glass | 1.517 | 64.2 | — |
| 19 | | Plano | 0.474 | | | | |
| 20 | Image | Plano | — | | | | |

Note:
Reference wavelength is 587.6 nm (d-line).
An effective radius of the stop S1 (Surface 10) is 1.690 mm.
An effective radius of the stop S2 (Surface 15) is 3.426 mm.

TABLE 2

Aspheric Coefficients

| Surface # | 1 | 2 | 3 | 4 |
|---|---|---|---|---|
| k = | −4.56269000E−01 | 0.00000000E+00 | −1.07810000E+00 | 4.51102000E+00 |
| A4 = | 1.36076798E−01 | 1.92992051E−01 | 6.14498435E−02 | 1.99141881E−02 |
| A6 = | −8.54874608E−02 | −1.82368078E−01 | −1.26631007E−01 | −1.15427405E−01 |
| A8 = | 5.14477783E−02 | 1.93330862E−01 | 1.56150564E−01 | 5.05477601E−01 |
| A10 = | −2.46995248E−02 | −2.28864131E−01 | −1.46889906E−01 | −1.31806424E+00 |
| A12 = | 8.34677983E−03 | 2.58957024E−01 | 7.95911196E−02 | 1.98801573E+00 |
| A14 = | −1.47215031E−03 | −2.45811225E−01 | −2.07118217E−02 | −1.59866420E+00 |
| A16 = | −1.87766176E−04 | 1.82388581E−01 | 2.07374421E−03 | 5.52449017E−01 |
| A18 = | 2.14039235E−04 | −1.02196938E−01 | — | — |
| A20 = | −7.17440451E−05 | 4.22684351E−02 | — | — |
| A22 = | 1.43178388E−05 | −1.25992717E−02 | — | — |
| A24 = | −1.84611223E−06 | 2.61640279E−03 | — | — |
| A26 = | 1.51215673E−07 | −3.57668310E−04 | — | — |
| A28 = | −7.17375223E−09 | 2.88364348E−05 | — | — |
| A30 = | 1.50203270E−10 | −1.03603348E−06 | — | — |

| Surface # | 6 | 7 | 8 | 9 |
|---|---|---|---|---|
| k = | −8.37786000E+01 | 5.09783000E−01 | −5.35940000E+01 | 0.00000000E+00 |
| A4 = | 8.65181110E−03 | −9.05696497E−02 | −1.53676875E−01 | −4.58260157E−02 |
| A6 = | −4.16372742E−02 | 1.81300646E−02 | −1.68424475E−01 | −1.65015952E−01 |
| A8 = | 7.61403597E−02 | 4.78186621E−02 | 1.12096524E+00 | 5.34408242E−01 |
| A10 = | −1.29517978E−01 | −9.63748741E−02 | −4.23911490E+00 | −1.07174649E+00 |
| A12 = | 5.58121160E−02 | 6.32247288E−02 | 1.20621946E+01 | 1.62074917E+00 |
| A14 = | — | −1.94929568E−02 | −2.48505380E+01 | −1.83601583E+00 |

TABLE 2-continued

| Aspheric Coefficients | | | | |
|---|---|---|---|---|
| A16 = | — | — | 3.68051970E+01 | 1.53809608E+00 |
| A18 = | — | — | −3.92856645E+01 | −9.46826163E−01 |
| A20 = | — | — | 3.01355252E+01 | 4.25366759E−01 |
| A22 = | — | — | −1.63939113E+01 | −1.37489943E−01 |
| A24 = | — | — | 6.14547114E+00 | 3.10720718E−02 |
| A26 = | — | — | −1.50291398E+00 | −4.65054527E−03 |
| A28 = | — | — | 2.14921670E−01 | 4.13394117E−04 |
| A30 = | — | — | −1.35795103E−02 | −1.64981118E−05 |

| Surface # | 11 | 12 | 13 | 14 |
|---|---|---|---|---|
| k = | −1.03558000E+00 | −1.76507000E+00 | −7.71072000E−01 | −8.21616000E−01 |
| A4 = | 5.09689563E−02 | −1.42601859E−01 | −5.14645392E−02 | 1.96321115E−02 |
| A6 = | 3.59754080E−02 | 2.39344668E−01 | 4.27762075E−02 | −4.82263872E−02 |
| A8 = | −3.77389731E−01 | −3.56213962E−01 | −7.91384262E−02 | 1.78958817E−02 |
| A10 = | 1.08802519E+00 | 3.94622199E−01 | 7.15804516E−02 | −3.83314442E−03 |
| A12 = | −1.94117170E+00 | −3.03223896E−01 | −4.40426996E−02 | 8.21622082E−04 |
| A14 = | 2.35267044E+00 | 1.48240616E−01 | 1.98814510E−02 | −3.07614064E−04 |
| A16 = | −2.00135911E+00 | −3.26209130E−02 | −6.63486194E−03 | 1.14089290E−04 |
| A18 = | 1.21175743E+00 | −9.85280834E−03 | 1.62904836E−03 | −2.98160422E−05 |
| A20 = | −5.23260870E−01 | 1.08509767E−02 | −2.91719477E−04 | 5.32322657E−06 |
| A22 = | 1.59670380E−01 | −4.24548440E−03 | 3.74907504E−05 | −6.49502178E−07 |
| A24 = | −3.35978083E−02 | 9.54679078E−04 | −3.35636111E−06 | 5.32860415E−08 |
| A26 = | 4.63510963E−03 | −1.29025443E−04 | 1.98157229E−07 | −2.80924122E−09 |
| A28 = | −3.77124641E−04 | 9.76404260E−06 | −6.91768807E−09 | 8.59087624E−11 |
| A30 = | 1.37063255E−05 | −3.18853410E−07 | 1.07934192E−10 | −1.15743140E−12 |

| Surface # | 16 | 17 |
|---|---|---|
| k = | −1.14124000E+00 | −1.10704000E+00 |
| A4 = | −2.97788055E−01 | −3.74898710E−01 |
| A6 = | 1.16147583E−01 | 2.19813880E−01 |
| A8 = | −1.59357035E−02 | −9.92541119E−02 |
| A10 = | −7.45183898E−03 | 3.39622785E−02 |
| A12 = | 5.32612625E−03 | −8.64258894E−03 |
| A14 = | −1.72937290E−03 | 1.62833072E−03 |
| A16 = | 3.59020697E−04 | −2.27272792E−04 |
| A18 = | −5.12293444E−05 | 2.34733809E−05 |
| A20 = | 5.13316905E−06 | −1.78195433E−06 |
| A22 = | −3.60808745E−07 | 9.78690522E−08 |
| A24 = | 1.74264059E−08 | −3.77375078E−09 |
| A26 = | −5.50870659E−10 | 9.66710546E−11 |
| A28 = | 1.02630302E−11 | −1.47414754E−12 |
| A30 = | −8.54333594E−14 | 1.01050396E−14 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
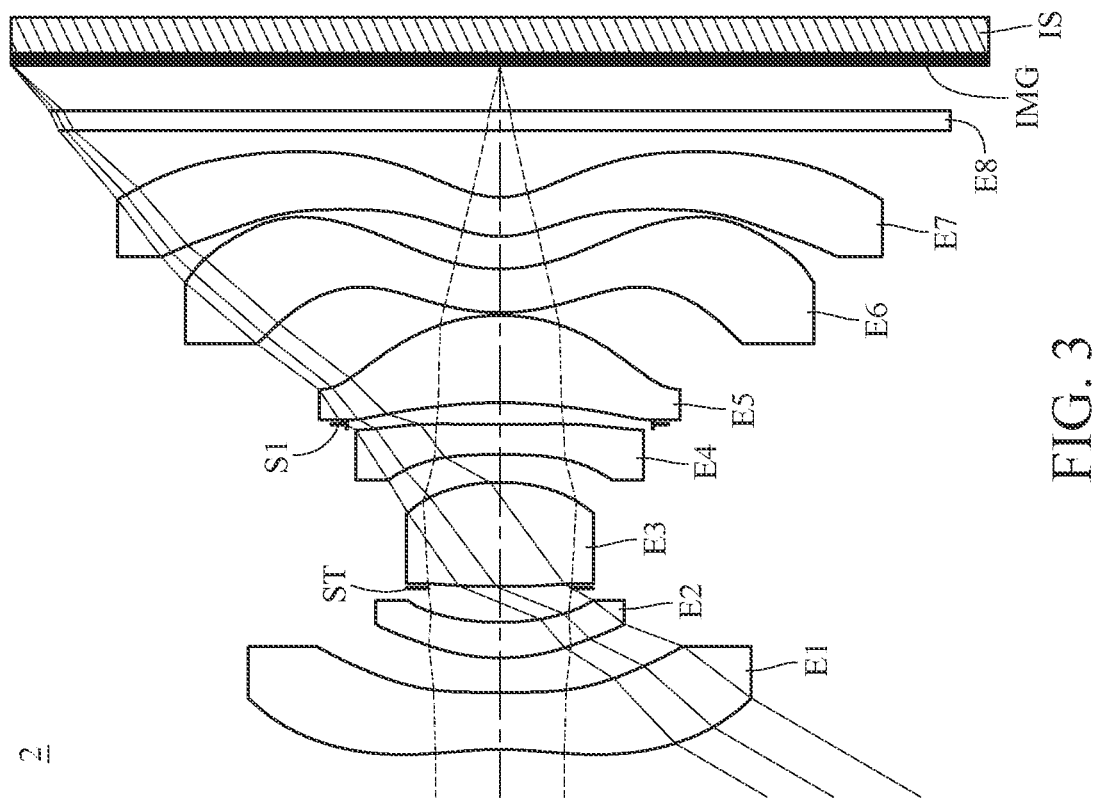
FIG. 3 is a schematic view of an image capturing unit according to the 2nd embodiment of the present disclosure.
Figure 4:
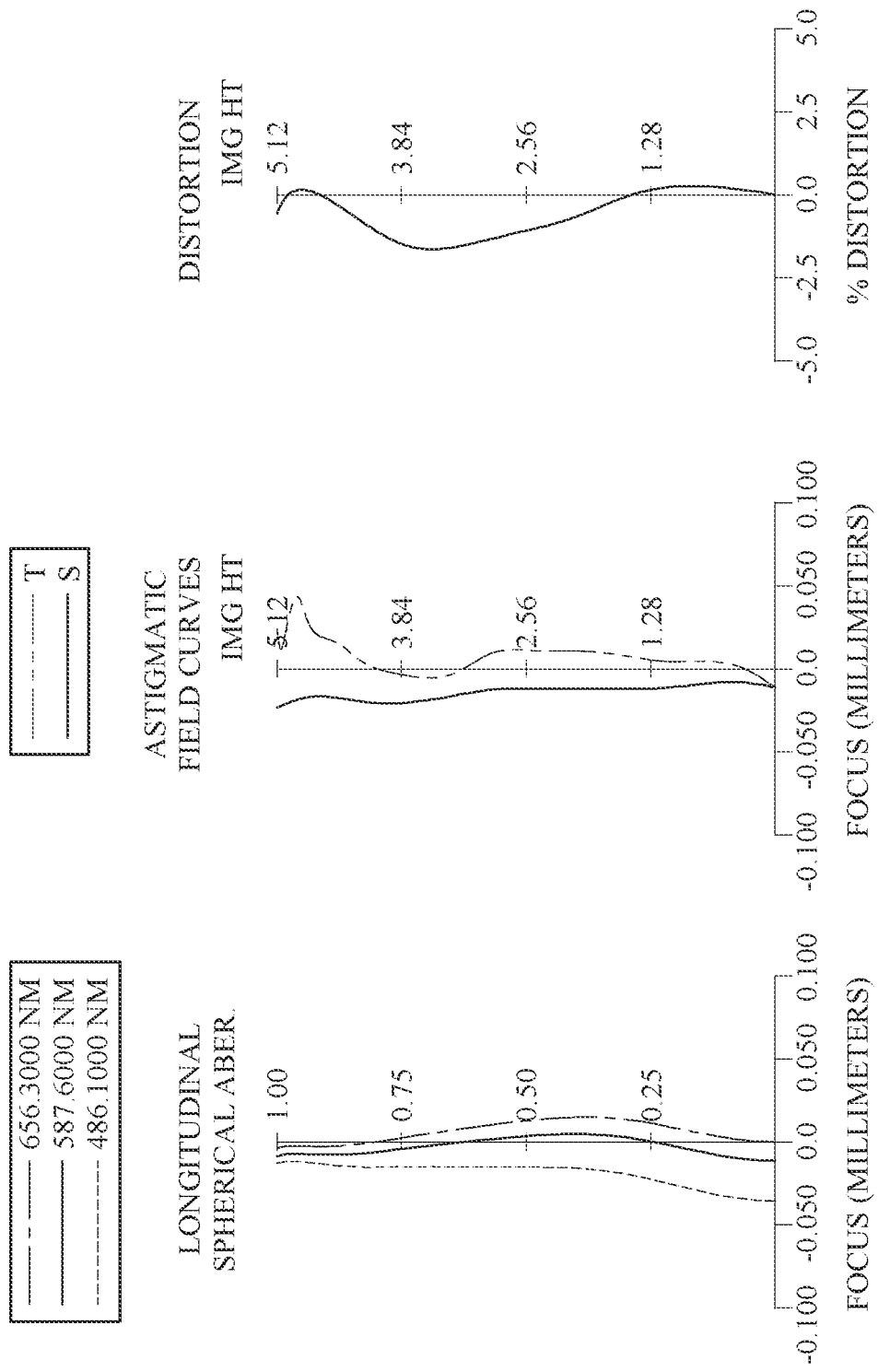
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has two critical points in an off-axis region thereof. The image-side surface of the fifth lens element E5 has two critical points in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has two inflection points. The object-side surface of the sixth lens element E6 has one critical point in an off-axis region thereof. The image-side surface of the sixth lens element E6 has two critical points in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points. The image-side surface of the seventh lens element E7 has two inflection points. The object-side surface of the seventh lens element E7 has one critical point in an off-axis region thereof. The image-side surface of the seventh lens element E7 has two critical points in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The detailed optical data of the 2nd embodiment are shown in Table 3 and the aspheric surface data are shown in Table 4 below.

TABLE 3

2nd Embodiment
f = 3.00 mm, Fno = 2.22, HFOV = 59.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.6722 (ASP) | 0.603 | Plastic | 1.545 | 56.1 | −7.85 |
| 2 | | −27.4484 (ASP) | 0.359 | | | | |
| 3 | Lens 2 | 2.2700 (ASP) | 0.374 | Plastic | 1.614 | 25.6 | 16.11 |
| 4 | | 2.7613 (ASP) | 0.361 | | | | |
| 5 | Ape. Stop | Plano | 0.014 | | | | |
| 6 | Lens 3 | 7.5921 (ASP) | 1.096 | Plastic | 1.544 | 56.0 | 3.08 |
| 7 | | −2.0404 (ASP) | 0.290 | | | | |
| 8 | Lens 4 | −13.4964 (ASP) | 0.316 | Plastic | 1.686 | 18.4 | −8.75 |
| 9 | | 10.9237 (ASP) | 0.000 | | | | |
| 10 | Stop | Plano | 0.232 | | | | |
| 11 | Lens 5 | −4.2987 (ASP) | 0.914 | Plastic | 1.544 | 56.0 | 7.28 |
| 12 | | −2.2162 (ASP) | 0.030 | | | | |
| 13 | Lens 6 | 2.1171 (ASP) | 0.460 | Plastic | 1.544 | 56.0 | −97.25 |
| 14 | | 1.8798 (ASP) | 0.341 | | | | |
| 15 | Lens 7 | 1.1027 (ASP) | 0.411 | Plastic | 1.566 | 37.4 | −29.75 |
| 16 | | 0.8955 (ASP) | 0.700 | | | | |
| 17 | Filter | Plano | 0.210 | Glass | 1.517 | 64.2 | — |
| 18 | | Plano | 0.478 | | | | |
| 19 | Image | Plano | — | | | | |

Note:
Reference wavelength is 587.6 nm (d-line).
An effective radius of the stop S1 (Surface 10) is 1.607 mm.

TABLE 4

Aspheric Coefficients

| Surface # | 1 | 2 | 3 | 4 |
|---|---|---|---|---|
| k = | −4.81068000E−01 | −5.99225000E+01 | −1.23324000E+00 | 4.25715000E+00 |
| A4 = | 1.39532252E−01 | 1.91008374E−01 | 6.68343021E−02 | 3.23232139E−02 |
| A6 = | −9.85105769E−02 | −1.64202302E−01 | −1.29330342E−01 | −1.45799236E−01 |
| A8 = | 7.60639252E−02 | 1.22191984E−01 | 1.38600967E−01 | 5.01231983E−01 |
| A10 = | −5.42136963E−02 | −3.84655339E−02 | −1.25407361E−01 | −1.16555757E+00 |
| A12 = | 3.25117463E−02 | −8.77431469E−02 | 6.82762212E−02 | 1.63739356E+00 |
| A14 = | −1.55338830E−02 | 1.88753381E−01 | −1.65925280E−02 | −1.24316699E+00 |
| A16 = | 5.75267490E−03 | −2.00497164E−01 | 1.20441023E−03 | 4.11714464E−01 |
| A18 = | −1.62379249E−03 | 1.38366106E−01 | — | — |
| A20 = | 3.43902739E−04 | −6.59035619E−02 | — | — |
| A22 = | −5.35094303E−05 | 2.19108603E−02 | — | — |
| A24 = | 5.91715319E−06 | −5.00297815E−03 | — | — |
| A26 = | −4.39264955E−07 | 7.48426049E−04 | — | — |
| A28 = | 1.95981481E−08 | −6.60755534E−05 | — | — |
| A30 = | −3.96751923E−10 | 2.60964167E−06 | — | — |

| Surface # | 6 | 7 | 8 | 9 |
|---|---|---|---|---|
| k = | −6.60088000E+01 | 4.52863000E−01 | 2.55247000E+01 | 9.54217000E+00 |
| A4 = | 1.10981240E−02 | −8.16846625E−02 | −1.75746739E−01 | −7.20991829E−02 |
| A6 = | −3.41288859E−02 | 2.09562001E−02 | 1.70559959E−01 | 5.30867096E−02 |
| A8 = | 6.63793218E−02 | −3.11063316E−02 | −1.03043769E+00 | −2.82459203E−01 |
| A10 = | −2.57351829E−01 | 1.37468424E−01 | 4.29369549E+00 | 8.57127925E−01 |
| A12 = | 5.42560451E−01 | −3.07408288E−01 | −1.14103552E+01 | −1.55898239E+00 |
| A14 = | −6.84416459E−01 | 3.19167292E−01 | 2.13512669E+01 | 1.96202977E+00 |
| A16 = | 3.45115245E−01 | −1.66001645E−01 | −2.90638721E+01 | −1.79005520E+00 |
| A18 = | — | 3.39457601E−02 | 2.88784652E+01 | 1.19141492E+00 |
| A20 = | — | — | −2.06969298E+01 | −5.70723502E−01 |
| A22 = | — | — | 1.04075308E+01 | 1.91026067E−01 |
| A24 = | — | — | −3.48233214E+00 | −4.23179544E−02 |
| A26 = | — | — | 6.96151030E−01 | 5.56908034E−03 |
| A28 = | — | — | −6.28909843E−02 | −3.29403884E−04 |

| Surface # | 11 | 12 | 13 | 14 |
|---|---|---|---|---|
| k = | −1.74282000E+00 | −1.92832000E+00 | −7.23721000E−01 | −8.34105000E−01 |
| A4 = | 4.92631019E−02 | −1.16593193E−01 | −5.19279342E−02 | −7.62639494E−03 |
| A6 = | −5.31483492E−02 | 9.33872362E−02 | 3.33303270E−02 | −3.29965170E−03 |
| A8 = | 2.67702408E−01 | 9.01009614E−02 | −5.23179726E−02 | −3.41728151E−02 |
| A10 = | −9.79919279E−01 | −4.55435097E−01 | 2.90700110E−02 | 3.61181994E−02 |
| A12 = | 2.05276196E+00 | 7.92684154E−01 | −3.42772954E−03 | −1.98404313E−02 |
| A14 = | −2.82366691E+00 | −8.53529746E−01 | −5.20462246E−03 | 7.18197169E−03 |
| A16 = | 2.72901527E+00 | 6.32280742E−01 | 3.89767497E−03 | −1.84192688E−03 |
| A18 = | −1.90580975E+00 | −3.33544964E−01 | −1.46236629E−03 | 3.43116690E−04 |
| A20 = | 9.67170466E−01 | 1.26441337E−01 | 3.49343265E−04 | −4.65817266E−05 |
| A22 = | −3.52833750E−01 | −3.42081954E−02 | −5.59595733E−05 | 4.55617623E−06 |
| A24 = | 8.99738822E−02 | 6.45095874E−03 | 6.00259969E−06 | −3.12224876E−07 |
| A26 = | −1.51947043E−02 | −8.06760861E−04 | −4.14217986E−07 | 1.42033677E−08 |
| A28 = | 1.52462423E−03 | 6.02397459E−05 | 1.66282633E−08 | −3.84719105E−10 |
| A30 = | −6.87382354E−05 | −2.03618279E−06 | −2.95073294E−10 | 4.69039790E−12 |

| Surface # | 15 | 16 |
|---|---|---|
| k = | −1.15272000E+00 | −1.09919000E+00 |
| A4 = | −3.17407223E−01 | −3.71213896E−01 |
| A6 = | 1.55482463E−01 | 2.22783962E−01 |
| A8 = | −5.72245565E−02 | −1.06232882E−01 |
| A10 = | 1.72902725E−02 | 3.89796143E−02 |
| A12 = | −3.95157439E−03 | −1.06823750E−02 |
| A14 = | 5.73013768E−04 | 2.16975921E−03 |
| A16 = | −2.98713376E−05 | −3.26925651E−04 |
| A18 = | −6.24159933E−06 | 3.65471405E−05 |
| A20 = | 1.63053713E−06 | −3.01498239E−06 |
| A22 = | −1.87559165E−07 | 1.80880635E−07 |
| A24 = | 1.28650779E−08 | −7.66562855E−09 |
| A26 = | −5.40090396E−10 | 2.17329100E−10 |
| A28 = | 1.28570946E−11 | −3.69608611E−12 |
| A30 = | −1.33368295E−13 | 2.84950803E−14 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.00 | (R1 + R2)/(R1 − R2) | −1.31 |
| Fno | 2.22 | (R10 + R11 )/(R10 − R11) | 0.02 |
| HFOV [deg.] | 59.7 | R12/R14 | 2.10 |
| CT_MAX/f | 0.36 | (R9 + R13)/(R9 − R13) | 0.59 |
| CT3/T56 | 36.53 | (T12 + T23)/ΣAT | 0.45 |
| f/(CT1 + CT2) | 3.07 | (T12 + T23)/(T34 + T45 + T56 + T67) | 0.82 |
| f/CT2 | 8.03 | T23/T34 | 1.29 |
| CT5/T45 | 3.94 | TL/ImgH | 1.40 |
| f/CT7 | 7.31 | SL/f | 1.83 |
| f/f12 | −0.20 | V7/V4 | 2.04 |
| f/f56 | 0.41 | V1/N1 | 36.30 |
| f/f67 | −0.13 | V2/N2 | 15.85 |
| f/f1 | −0.38 | V3/N3 | 36.26 |
| f/f7 | −0.10 | V4/N4 | 10.90 |
| f/R3 | 1.32 | V5/N5 | 36.26 |
| f/(T12 + T23) | 4.09 | V6/N6 | 36.26 |
| (N2 + N4)/2 | 1.65 | V7/N7 | 23.91 |
| (N4 + N6)/2 | 1.62 | Y1R1/Y3R1 | 3.48 |
| (R1 + R13)/(R1 − R13) | 0.54 | — | — |

3rd Embodiment

Figure 5:
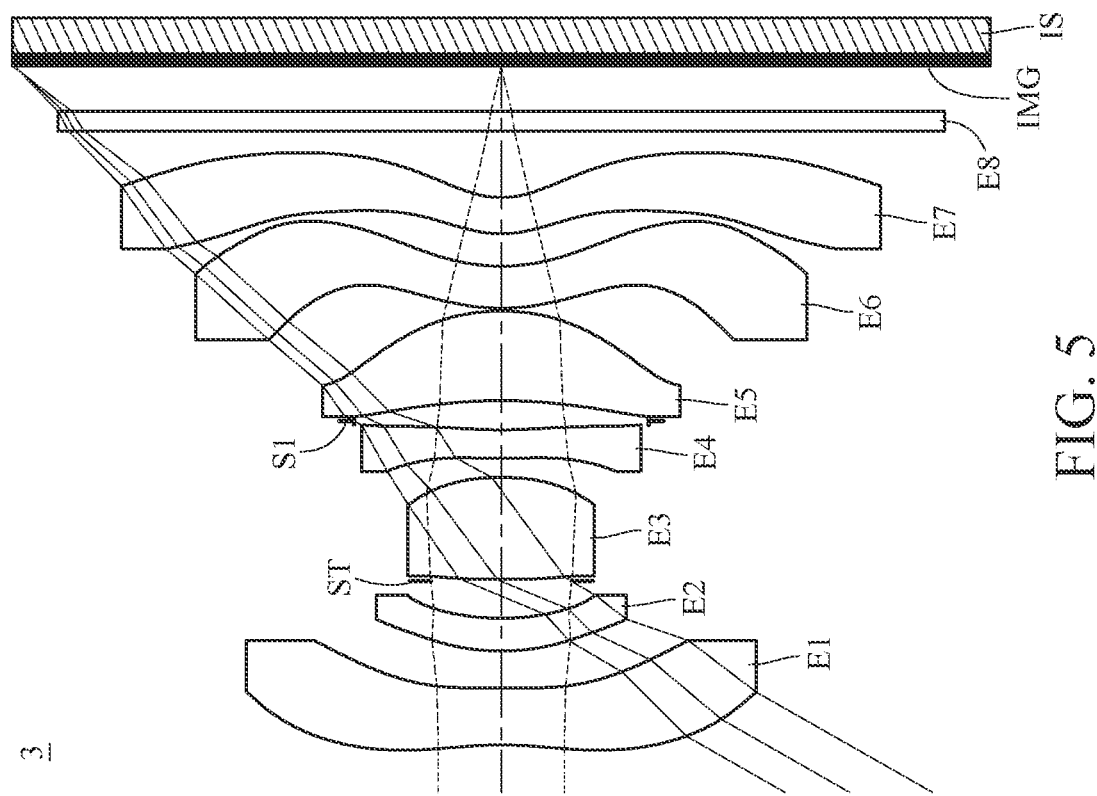
FIG. 5 is a schematic view of an image capturing unit according to the 3rd embodiment of the present disclosure.
Figure 6:
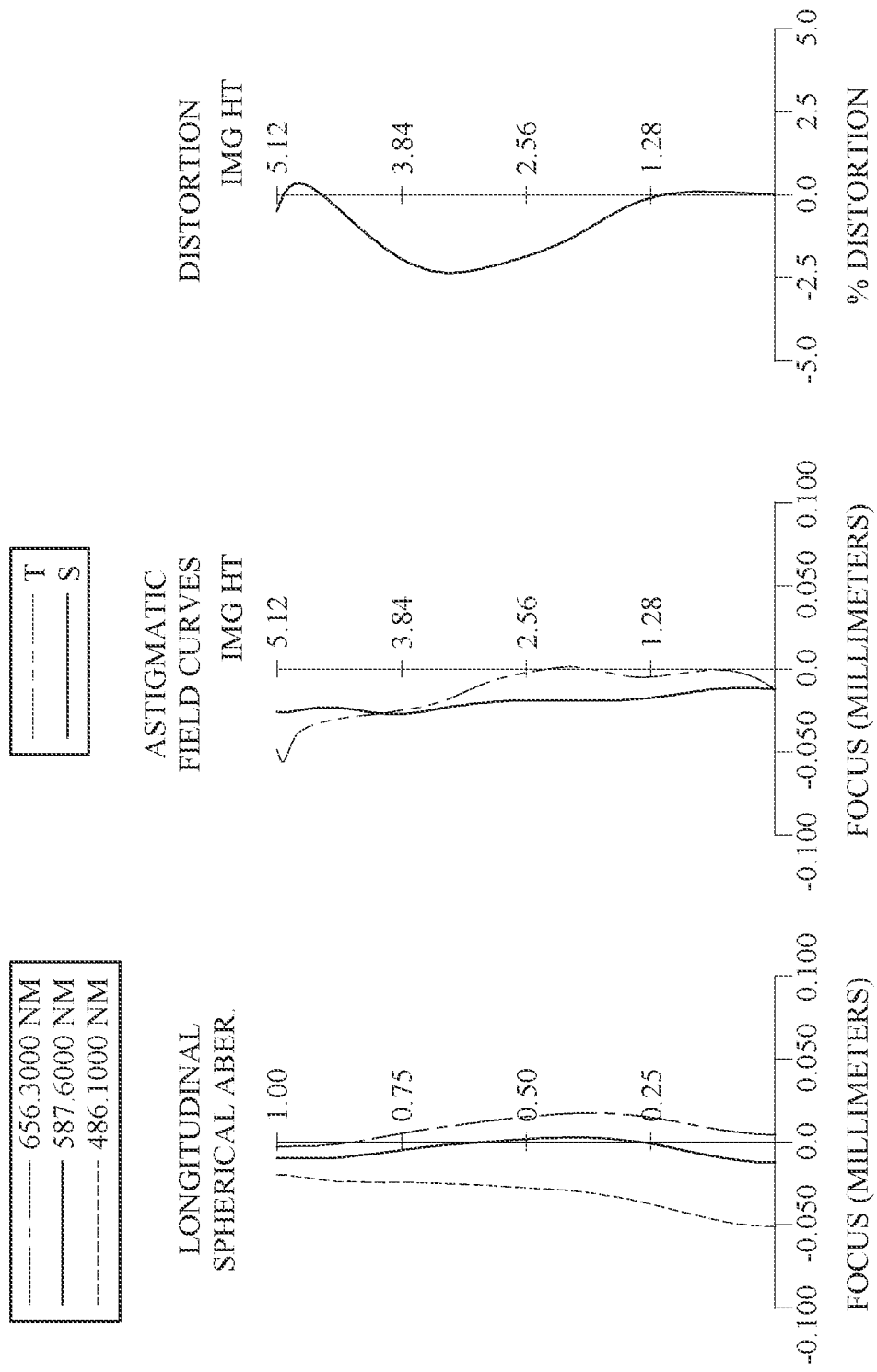
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points. The object-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points. The image-side surface of the seventh lens element E7 has three inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The detailed optical data of the 3rd embodiment are shown in Table 5 and the aspheric surface data are shown in Table 6 below.

TABLE 5

3rd Embodiment
f = 2.93 mm, Fno = 2.22, HFOV = 60.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.6055 (ASP) | 0.599 | Plastic | 1.535 | 55.9 | −7.91 |
| 2 | | −25.8624 (ASP) | 0.387 | | | | |
| 3 | Lens 2 | 2.3329 (ASP) | 0.346 | Plastic | 1.614 | 25.6 | 19.84 |
| 4 | | 2.7223 (ASP) | 0.390 | | | | |
| 5 | Ape. Stop | Plano | 0.017 | | | | |
| 6 | Lens 3 | 7.1882 (ASP) | 1.076 | Plastic | 1.544 | 56.0 | 3.45 |
| 7 | | −2.4049 (ASP) | 0.200 | | | | |
| 8 | Lens 4 | 9.9035 (ASP) | 0.300 | Plastic | 1.686 | 18.4 | −19.84 |
| 9 | | 5.6623 (ASP) | 0.091 | | | | |
| 10 | Stop | Plano | 0.217 | | | | |
| 11 | Lens 5 | −4.4735 (ASP) | 0.941 | Plastic | 1.544 | 56.0 | 7.39 |
| 12 | | −2.2740 (ASP) | 0.030 | | | | |
| 13 | Lens 6 | 2.1405 (ASP) | 0.442 | Plastic | 1.587 | 28.3 | −3469.25 |
| 14 | | 1.9749 (ASP) | 0.341 | | | | |
| 15 | Lens 7 | 1.1548 (ASP) | 0.381 | Plastic | 1.587 | 28.3 | −15.99 |
| 16 | | 0.9028 (ASP) | 0.700 | | | | |
| 17 | Filter | Plano | 0.210 | Glass | 1.517 | 64.2 | — |
| 18 | | Plano | 0.476 | | | | |
| 19 | Image | Plano | — | | | | |

Note:
Reference wavelength is 587.6 nm (d-line).
An effective radius of the stop S1 (Surface 10) is 1.548 mm.

TABLE 6

Aspheric Coefficients

| Surface # | 1 | 2 | 3 | 4 |
|---|---|---|---|---|
| k = | −4.83518000E−01 | −8.97117000E+01 | −1.44637000E+00 | 3.94013000E+00 |
| A4 = | 1.37541623E−01 | 1.85996883E−01 | 6.12465492E−02 | 3.29925215E−02 |
| A6 = | −9.46988343E−02 | −1.78411378E−01 | −1.19255565E−01 | −1.50226475E−01 |
| A8 = | 7.12215880E−02 | 2.27716652E−01 | 1.35875508E−01 | 5.31245223E−01 |
| A10 = | −4.86797503E−02 | −3.26364782E−01 | −1.43141272E−01 | −1.26784181E+00 |
| A12 = | 2.75292061E−02 | 4.00581372E−01 | 9.20795834E−02 | 1.77632189E+00 |
| A14 = | −1.22598496E−02 | −3.78512962E−01 | −2.83477266E−02 | −1.32401882E+00 |
| A16 = | 4.20498780E−03 | 2.66851395E−01 | 3.25441790E−03 | 4.24763108E−01 |
| A18 = | −1.09682075E−03 | −1.38888391E−01 | — | — |
| A20 = | 2.14814323E−04 | 5.28794373E−02 | — | — |
| A22 = | −3.09942306E−05 | −1.44957636E−02 | — | — |
| A24 = | 3.19121736E−06 | 2.77860631E−03 | — | — |
| A26 = | −2.21647887E−07 | −3.52804292E−04 | — | — |
| A28 = | 9.30053531E−09 | 2.66188059E−05 | — | — |
| A30 = | −1.78026847E−10 | −9.02262807E−07 | — | — |

| Surface # | 6 | 7 | 8 | 9 |
|---|---|---|---|---|
| k = | −4.41574000E+01 | 5.89600000E−01 | 4.02070000E+01 | 5.92135000E+00 |
| A4 = | 8.76778140E−03 | −1.25439568E−01 | −1.79906735E−01 | −5.22125890E−02 |
| A6 = | −1.14011685E−02 | 9.60926537E−02 | 1.15723933E−01 | −8.59991124E−02 |
| A8 = | −6.01283017E−02 | −1.40587045E−01 | −5.51666979E−01 | 2.11211370E−01 |
| A10 = | 2.61543255E−01 | 2.77192409E−01 | 2.38707438E+00 | −2.96333710E−01 |
| A12 = | −5.57569094E−01 | −4.28736051E−01 | −6.28318717E+00 | 3.77377876E−01 |
| A14 = | 5.23832796E−01 | 3.81155355E−01 | 1.12799111E+01 | −4.29326801E−01 |
| A16 = | −1.79657538E−01 | −1.80737481E−01 | −1.44923378E+01 | 3.78707870E−01 |
| A18 = | — | 3.52363399E−02 | 1.34826365E+01 | −2.37432566E−01 |
| A20 = | — | — | −9.01072518E+00 | 1.00865267E−01 |
| A22 = | — | — | 4.21451164E+00 | −2.74325024E−02 |
| A24 = | — | — | −1.30868558E+00 | 4.25049650E−03 |
| A26 = | — | — | 2.42211723E−01 | −2.64921322E−04 |
| A28 = | — | — | −2.02072961E−02 | −4.88016178E−06 |

| Surface # | 11 | 12 | 13 | 14 |
|---|---|---|---|---|
| k = | −1.93002000E+00 | −1.92663000E+00 | −7.60164000E−01 | −8.25428000E−01 |
| A4 = | 6.73939718E−02 | −1.15442366E−01 | −7.86950020E−02 | −2.72792375E−02 |
| A6 = | −1.54821790E−01 | 1.27720603E−01 | 7.85373490E−02 | 1.54617405E−02 |
| A8 = | 4.43124025E−01 | −5.26217334E−02 | −1.17907878E−01 | −3.41344352E−02 |
| A10 = | −1.02555559E+00 | −1.61987463E−01 | 1.16140466E−01 | 2.44448457E−02 |
| A12 = | 1.68903409E+00 | 4.23891615E−01 | −9.02051085E−02 | −9.86061685E−03 |
| A14 = | −2.00232435E+00 | −5.54248919E−01 | 5.48565710E−02 | 2.60291699E−03 |

TABLE 6-continued

| Aspheric Coefficients | | | |
|---|---|---|---|
| A16 = | 1.74921996E+00 | 4.76263395E-01 | -2.51229277E-02 | -4.75328565E-04 |
| A18 = | -1.13996131E+00 | -2.86188457E-01 | 8.50740808E-03 | 6.10367897E-05 |
| A20 = | 5.53189284E-01 | 1.22416505E-01 | -2.11059515E-03 | -5.48454885E-06 |
| A22 = | -1.96704750E-01 | -3.71791398E-02 | 3.78292074E-04 | 3.39084358E-07 |
| A24 = | 4.96354244E-02 | 7.84783012E-03 | -4.76329713E-05 | -1.41678905E-08 |
| A26 = | -8.39709056E-03 | -1.09595131E-03 | 3.99276678E-06 | 4.03215478E-10 |
| A28 = | 8.53002492E-04 | 9.10810797E-05 | -1.99826881E-07 | -8.24956163E-12 |
| A30 = | -3.93111835E-05 | -3.40930680E-06 | 4.51251714E-09 | 1.06442599E-13 |

| Surface # | 15 | 16 |
|---|---|---|
| k = | -1.14023000E+00 | -1.09433000E+00 |
| A4 = | -3.15432483E-01 | -3.71088927E-01 |
| A6 = | 1.49401927E-01 | 2.19811424E-01 |
| A8 = | -5.40500315E-02 | -1.02612543E-01 |
| A10 = | 1.80591134E-02 | 3.66410429E-02 |
| A12 = | -5.46893773E-03 | -9.71508685E-03 |
| A14 = | 1.34286300E-03 | 1.89947644E-03 |
| A16 = | -2.51166602E-04 | -2.74507063E-04 |
| A18 = | 3.50169353E-05 | 2.93756228E-05 |
| A20 = | -3.59443970E-06 | -2.31857841E-06 |
| A22 = | 2.66951185E-07 | 1.33168396E-07 |
| A24 = | -1.39131059E-08 | -5.41073068E-09 |
| A26 = | 4.81642183E-10 | 1.47364182E-10 |
| A28 = | -9.93145186E-12 | -2.41321589E-12 |
| A30 = | 9.22308073E-14 | 1.79596464E-14 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.93 | (R1 + R2)/(R1 − R2) | -1.32 |
| Fno | 2.22 | (R10 + R11)/(R10 − R11) | 0.03 |
| HFOV [deg.] | 60.3 | R12/R14 | 2.19 |
| CT_MAX/f | 0.37 | (R9 + R13)/(R9 − R13) | 0.59 |
| CT3/T56 | 35.87 | (T12 + T23)/ΣAT | 0.47 |
| f/(CT1 + CT2) | 3.10 | (T12 + T23)/(T34 + T45 + T56 + T67) | 0.90 |
| f/CT2 | 8.47 | T23/T34 | 2.04 |
| CT5/T45 | 3.06 | TL/ImgH | 1.40 |
| f/CT7 | 7.69 | SL/f | 1.85 |
| f/f12 | -0.22 | V7/V4 | 1.54 |
| f/f56 | 0.43 | V1/N1 | 36.46 |
| f/f67 | -0.17 | V2/N2 | 15.85 |
| f/f1 | -0.37 | V3/N3 | 36.26 |
| f/f7 | -0.18 | V4/N4 | 10.90 |
| f/R3 | 1.26 | V5/N5 | 36.26 |
| f/(T12 + T23) | 3.69 | V6/N6 | 17.83 |
| (N2 + N4)/2 | 1.65 | V7/N7 | 17.83 |
| (N4 + N6)/2 | 1.64 | Y1R1/Y3R1 | 3.56 |
| (R1 + R13)/(R1 − R13) | 0.51 | — | — |

4th Embodiment

Figure 7:
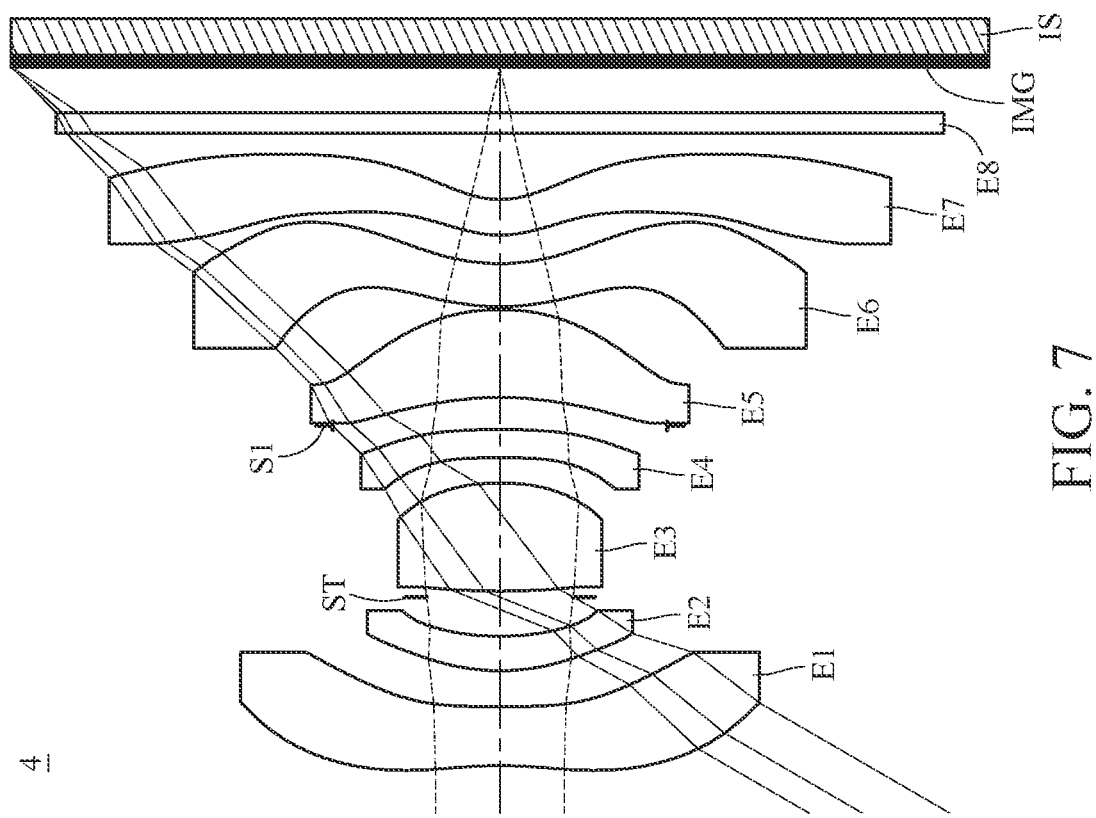
FIG. 7 is a schematic view of an image capturing unit according to the 4th embodiment of the present disclosure.
Figure 8:
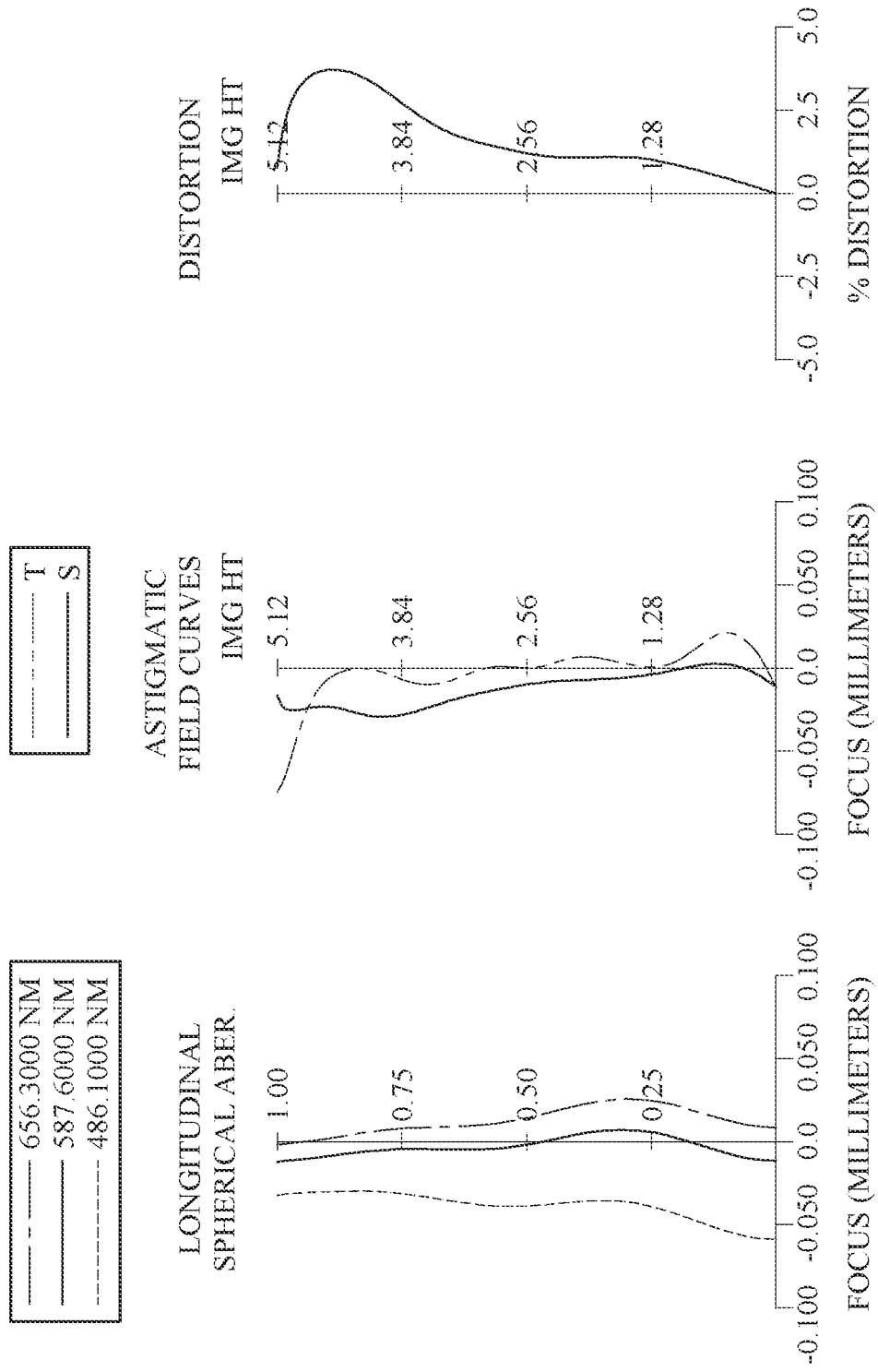
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points. The image-side surface of the seventh lens element E7 has one inflection point. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The detailed optical data of the 4th embodiment are shown in Table 7 and the aspheric surface data are shown in Table 8 below.

TABLE 7

4th Embodiment
f = 2.94 mm, Fno = 2.17, HFOV = 59.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.7434 (ASP) | 0.621 | Plastic | 1.562 | 44.6 | −7.22 |
| 2 | | −51.4381 (ASP) | 0.373 | | | | |
| 3 | Lens 2 | 2.2894 (ASP) | 0.361 | Plastic | 1.587 | 28.3 | 17.19 |
| 4 | | 2.7883 (ASP) | 0.412 | | | | |
| 5 | Ape. Stop | Plano | 0.061 | | | | |
| 6 | Lens 3 | 6.8910 (ASP) | 1.136 | Plastic | 1.534 | 56.0 | 3.40 |
| 7 | | −2.3242 (ASP) | 0.266 | | | | |
| 8 | Lens 4 | −10.7446 (ASP) | 0.294 | Plastic | 1.686 | 18.4 | 131.58 |
| 9 | | −9.7087 (ASP) | 0.038 | | | | |
| 10 | Stop | Plano | 0.299 | | | | |
| 11 | Lens 5 | −3.2279 (ASP) | 0.921 | Plastic | 1.534 | 56.0 | 11.39 |
| 12 | | −2.3184 (ASP) | 0.030 | | | | |
| 13 | Lens 6 | 2.3341 (ASP) | 0.452 | Plastic | 1.686 | 18.4 | −81.38 |
| 14 | | 2.0639 (ASP) | 0.299 | | | | |
| 15 | Lens 7 | 1.1603 (ASP) | 0.373 | Plastic | 1.614 | 25.6 | −15.51 |
| 16 | | 0.9078 (ASP) | 0.700 | | | | |
| 17 | Filter | Plano | 0.210 | Glass | 1.517 | 64.2 | — |
| 18 | | Plano | 0.480 | | | | |
| 19 | Image | Plano | — | | | | |

Note:
Reference wavelength is 587.6 nm (d-line).
An effective radius of the stop S1 (Surface 10) is 1.752 mm.

TABLE 8

Aspheric Coefficients

| Surface # | 1 | 2 | 3 | 4 |
|---|---|---|---|---|
| k = | −4.77307000E−01 | −9.00000000E+01 | −1.44727000E+00 | 4.08431000E+00 |
| A4 = | 1.35313443E−01 | 1.76219515E−01 | 5.73156822E−02 | 2.17341171E−02 |
| A6 = | −8.57364847E−02 | −1.15462718E−01 | −1.23724659E−01 | −1.43247225E−01 |
| A8 = | 5.46785316E−02 | 2.39541193E−02 | 1.40884709E−01 | 5.47709830E−01 |
| A10 = | −2.99743674E−02 | 8.84992934E−02 | −1.30421963E−01 | −1.26805290E+00 |
| A12 = | 1.33389935E−02 | −1.67316034E−01 | 7.38596992E−02 | 1.73178368E+00 |
| A14 = | −4.65771917E−03 | 1.66812201E−01 | −1.98754681E−02 | −1.26290406E+00 |
| A16 = | 1.24927169E−03 | −1.09196314E−01 | 1.89476585E−03 | 3.97098144E−01 |
| A18 = | −2.52638518E−04 | 4.92977841E−02 | — | — |
| A20 = | 3.76877060E−05 | −1.54719990E−02 | — | — |
| A22 = | −4.02275760E−06 | 3.32319892E−03 | — | — |
| A24 = | 2.93264806E−07 | −4.67861354E−04 | — | — |
| A26 = | −1.35192146E−08 | 3.93506208E−05 | — | — |

TABLE 8-continued

| Aspheric Coefficients | | | | |
|---|---|---|---|---|
| A28 = | 3.41588233E-10 | -1.57962257E-06 | — | — |
| A30 = | -3.37925641E-12 | 1.07766514E-08 | — | — |

| Surface # | 6 | 7 | 8 | 9 |
|---|---|---|---|---|
| k = | -3.54304000E+01 | 6.53200000E-01 | 4.93598000E+01 | -7.15334000E+00 |
| A4 = | 9.93212199E-03 | -1.16882693E-01 | -2.11769651E-01 | -5.99399975E-02 |
| A6 = | -2.14379874E-02 | 7.61562166E-02 | 5.65898572E-01 | 4.12062396E-02 |
| A8 = | 3.60455170E-02 | -9.89413192E-02 | -3.32339595E+00 | -4.17892792E-01 |
| A10 = | -9.38018221E-02 | 1.47334047E-01 | 1.29501268E+01 | 1.61198078E+00 |
| A12 = | 1.26897524E-01 | -2.00031113E-01 | -3.35965870E+01 | -3.46270129E+00 |
| A14 = | -1.24332304E-01 | 1.66699801E-01 | 6.08147632E+01 | 4.90440348E+00 |
| A16 = | 5.02513479E-02 | -7.47311805E-02 | -7.86040670E+01 | -4.85743761E+00 |
| A18 = | — | 1.32095953E-02 | 7.29687905E+01 | 3.42022584E+00 |
| A20 = | — | — | -4.82486656E+01 | -1.70116562E+00 |
| A22 = | — | — | 2.21718478E+01 | 5.82829221E-01 |
| A24 = | — | — | -6.73120475E+00 | -1.30644986E-01 |
| A26 = | — | — | 1.21466913E+00 | 1.72302071E-02 |
| A28 = | — | — | -9.87344317E-02 | -1.01312400E-03 |

| Surface # | 11 | 12 | 13 | 14 |
|---|---|---|---|---|
| k = | -1.63261000E+00 | -1.79371000E+00 | -7.60848000E-01 | -7.86878000E-01 |
| A4 = | 8.77506780E-02 | -1.12401437E-01 | -8.44387641E-02 | -2.61840040E-02 |
| A6 = | -2.38755490E-01 | 7.84456726E-02 | 9.40826364E-02 | 8.11928031E-03 |
| A8 = | 5.84344104E-01 | 1.47951295E-01 | -1.52431398E-01 | -2.36774318E-02 |
| A10 = | -1.10919779E+00 | -6.14620010E-01 | 1.67216631E-01 | 1.65885558E-02 |
| A12 = | 1.59007078E+00 | 1.07957719E+00 | -1.37964212E-01 | -6.04588347E-03 |
| A14 = | -1.72023697E+00 | -1.19452768E+00 | 8.46453550E-02 | 1.29933235E-03 |
| A16 = | 1.40952651E+00 | 9.08269670E-01 | -3.81140377E-02 | -1.47613893E-04 |
| A18 = | -8.76378885E-01 | -4.89334638E-01 | 1.25706978E-02 | -8.00321220E-07 |
| A20 = | 4.10732234E-01 | 1.88357768E-01 | -3.02791367E-03 | 3.27659755E-06 |
| A22 = | -1.42228985E-01 | -5.14351919E-02 | 5.26060907E-04 | -5.76856183E-07 |
| A24 = | 3.50871157E-02 | 9.72720365E-03 | -6.40784714E-05 | 5.40179792E-08 |
| A26 = | -5.80588563E-03 | -1.21123039E-03 | 5.17940378E-06 | -2.99650543E-09 |
| A28 = | 5.73477792E-04 | 8.93385074E-05 | -2.48770398E-07 | 9.30053630E-11 |
| A30 = | -2.55525313E-05 | -2.95797786E-06 | 5.35727599E-09 | -1.25002691E-12 |

| Surface # | 15 | 16 |
|---|---|---|
| k = | -1.12869000E+00 | -1.09129000E+00 |
| A4 = | -3.13088824E-01 | -3.71150811E-01 |
| A6 = | 1.40828807E-01 | 2.17585166E-01 |
| A8 = | -4.20508339E-02 | -9.93009800E-02 |
| A10 = | 9.12762397E-03 | 3.45136931E-02 |
| A12 = | -1.39567414E-03 | -8.90483457E-03 |
| A14 = | 1.15180015E-04 | 1.69585425E-03 |
| A16 = | 4.24601430E-06 | -2.38928252E-04 |
| A18 = | -2.52692012E-06 | 2.49377327E-05 |
| A20 = | 3.36510689E-07 | -1.91980522E-06 |
| A22 = | -2.44056192E-08 | 1.07513616E-07 |
| A24 = | 1.01879065E-09 | -4.25695623E-09 |
| A26 = | -2.14078172E-11 | 1.12900677E-10 |
| A28 = | 8.59197531E-14 | -1.79884843E-12 |
| A30 = | 2.94950665E-15 | 1.30134822E-14 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.94 | (R1 + R2)/(R1 - R2) | -1.16 |
| Fno | 2.17 | (R10 + R11)/(R10 - R11) | 0.00 |
| HFOV [deg.] | 59.9 | R12/R14 | 2.27 |
| CT_MAX/f | 0.39 | (R9 + R13)/(R9 - R13) | 0.47 |
| CT3/T56 | 37.87 | (T12 + T23)/ΣAT | 0.48 |
| f/(CT1 + CT2) | 2.99 | (T12 + T23)/(T34 + T45 + T56 + T67) | 0.91 |
| f/CT2 | 8.14 | T23/T34 | 1.78 |
| CT5/T45 | 2.73 | TL/ImgH | 1.43 |
| f/CT7 | 7.88 | SL/f | 1.89 |
| f/f12 | -0.24 | V7/V4 | 1.39 |
| f/f56 | 0.24 | V1/N1 | 28.57 |
| f/f67 | -0.22 | V2/N2 | 17.83 |
| f/f1 | -0.41 | V3/N3 | 36.48 |
| f/f7 | -0.19 | V4/N4 | 10.90 |
| f/R3 | 1.28 | V5/N5 | 36.48 |
| f/(T12 + T23) | 3.47 | V6/N6 | 10.90 |
| (N2 + N4)/2 | 1.64 | V7/N7 | 15.85 |

-continued

| 4th Embodiment | | | |
|---|---|---|---|
| (N4 + N6)/2 | 1.69 | Y1R1/Y3R1 | 3.35 |
| (R1 + R13)/(R1 − R13) | 0.53 | — | — |

5th Embodiment

Figure 9:
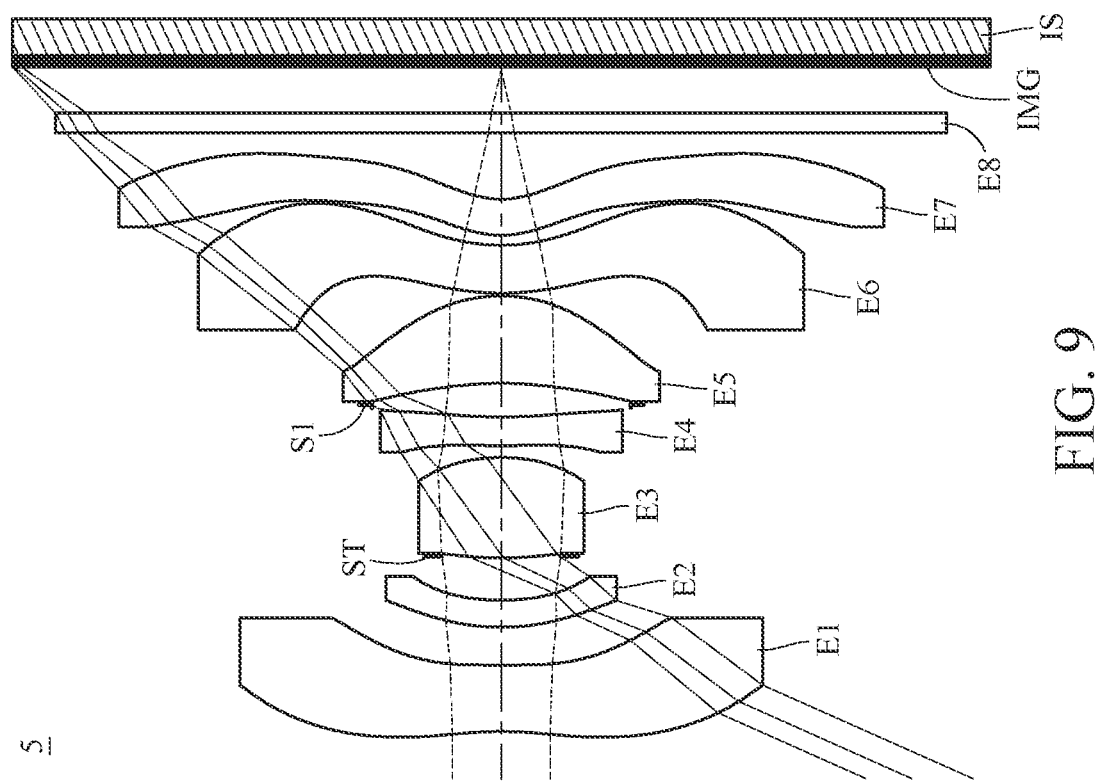
FIG. 9 is a schematic view of an image capturing unit according to the 5th embodiment of the present disclosure.
Figure 10:
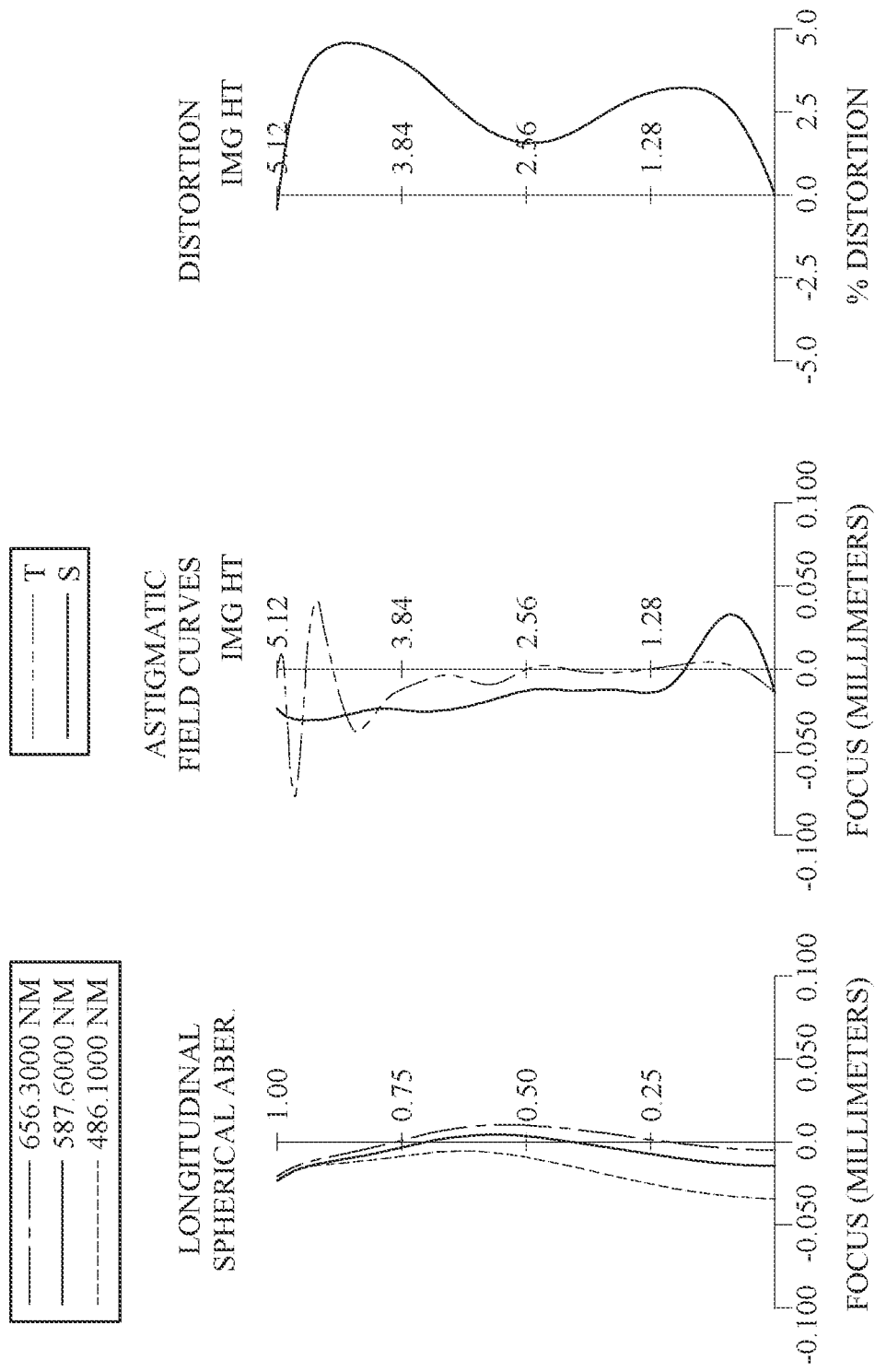
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points. The object-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has four inflection points. The image-side surface of the seventh lens element E7 has two inflection points. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The detailed optical data of the 5th embodiment are shown in Table 9 and the aspheric surface data are shown in Table 10 below.

TABLE 9

5th Embodiment
f = 2.28 mm, Fno = 2.22, HFOV = 66.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.5235 (ASP) | 0.699 | Plastic | 1.545 | 56.1 | −5.94 |
| 2 | | 42.9550 (ASP) | 0.401 | | | | |
| 3 | Lens 2 | 2.5346 (ASP) | 0.282 | Plastic | 1.639 | 23.5 | −68.61 |
| 4 | | 2.2921 (ASP) | 0.461 | | | | |
| 5 | Ape. Stop | Plano | −0.012 | | | | |
| 6 | Lens 3 | 4.1819 (ASP) | 1.056 | Plastic | 1.544 | 56.0 | 2.68 |
| 7 | | −2.0396 (ASP) | 0.127 | | | | |
| 8 | Lens 4 | 8.9206 (ASP) | 0.300 | Plastic | 1.669 | 19.5 | −16.32 |

TABLE 9-continued

5th Embodiment
f = 2.28 mm, Fno = 2.22, HFOV = 66.0 deg.

| Surface # | | Curvature Radius | Thickness | Material | Index | Abbe # | Focal Length |
|---|---|---|---|---|---|---|---|
| 9 | | 4.8429 (ASP) | 0.129 | | | | |
| 10 | Stop | Plano | 0.227 | | | | |
| 11 | Lens 5 | −3.6570 (ASP) | 0.920 | Plastic | 1.544 | 56.0 | 5.15 |
| 12 | | −1.7272 (ASP) | 0.030 | | | | |
| 13 | Lens 6 | 2.7128 (ASP) | 0.505 | Plastic | 1.729 | 15.1 | −15.66 |
| 14 | | 2.0198 (ASP) | 0.105 | | | | |
| 15 | Lens 7 | 1.0362 (ASP) | 0.380 | Plastic | 1.566 | 37.4 | 33.69 |
| 16 | | 0.9505 (ASP) | 0.700 | | | | |
| 17 | Filter | Plano | 0.210 | Glass | 1.517 | 64.2 | — |
| 18 | | Plano | 0.481 | | | | |
| 19 | Image | Plano | — | | | | |

Note:
Reference wavelength is 587.6 nm (d-line).
An effective radius of the stop S1 (Surface 10) is 1.362 mm.

TABLE 10

Aspheric Coefficients

| Surface # | 1 | 2 | 3 | 4 |
|---|---|---|---|---|
| k = | −4.20319000E−03 | 2.00359000E+01 | −6.75619000E−01 | 2.66295000E+00 |
| A4 = | 1.42809346E−01 | 1.35763667E−01 | 6.14533495E−02 | 1.62862734E−02 |
| A6 = | −1.04176355E−01 | 1.63667607E−01 | −2.12411641E−01 | −2.55297841E−02 |
| A8 = | 8.23144352E−02 | −1.11539225E+00 | 4.97436860E−01 | 2.72491770E−01 |
| A10 = | −5.84725901E−02 | 3.03032206E+00 | −7.12587543E−01 | −6.58342274E−01 |
| A12 = | 3.42563510E−02 | −5.30942081E+00 | 5.48176430E−01 | 5.90013932E−01 |
| A14 = | −1.57503239E−02 | 6.51250643E+00 | −2.11100988E−01 | −8.95902636E−02 |
| A16 = | 5.54536342E−03 | −5.75893933E+00 | 3.19187427E−02 | −6.72026242E−02 |
| A18 = | −1.47371338E−03 | 3.71192234E+00 | — | — |
| A20 = | 2.91569159E−04 | −1.74330664E+00 | — | — |
| A22 = | −4.21118754E−05 | 5.89661563E−01 | — | — |
| A24 = | 4.30028222E−06 | −1.39808644E−01 | — | — |
| A26 = | −2.93526611E−07 | 2.20380786E−02 | — | — |
| A28 = | 1.19976464E−08 | −2.07323298E−03 | — | — |
| A30 = | −2.21823163E−10 | 8.80414947E−05 | — | — |

| Surface # | 6 | 7 | 8 | 9 |
|---|---|---|---|---|
| k = | −2.13827000E+01 | 5.87015000E−01 | 3.41087000E+01 | 5.97452000E+00 |
| A4 = | 2.27582132E−02 | −1.08274386E−01 | −1.14868050E−01 | −2.72902394E−04 |
| A6 = | 1.20292881E−01 | −1.56903813E−01 | −5.80001135E−01 | −4.39039457E−01 |
| A8 = | −1.52446129E+00 | 1.14625822E+00 | 2.77131512E+00 | 1.47083411E+00 |
| A10 = | 7.64892198E+00 | −3.02463800E+00 | −6.54125931E+00 | −3.30766701E+00 |
| A12 = | −2.08335556E+01 | 4.60073788E+00 | 5.73625324E+00 | 5.57969764E+00 |
| A14 = | 2.88847784E+01 | −4.25134992E+00 | 1.47388641E+01 | −7.22547064E+00 |
| A16 = | −1.60225513E+01 | 2.18580139E+00 | −6.19948731E+01 | 7.29491273E+00 |
| A18 = | — | −4.78001833E−01 | 1.10743994E+02 | −5.75626911E+00 |
| A20 = | — | — | −1.19980875E+02 | 3.47923190E+00 |
| A22 = | — | — | 8.35281133E+01 | −1.53912752E+00 |
| A24 = | — | — | −3.66761013E+01 | 4.62804209E−01 |
| A26 = | — | — | 9.28202043E+00 | −8.34233359E−02 |
| A28 = | — | — | −1.03525308E+00 | 6.73198744E−03 |

| Surface # | 11 | 12 | 13 | 14 |
|---|---|---|---|---|
| k = | −1.63175000E+00 | −1.85849000E+00 | −4.64508000E−01 | −7.71063000E−01 |
| A4 = | 8.96648468E−02 | −1.25782614E−02 | −7.71310112E−02 | 1.25332279E−02 |
| A6 = | −4.19918468E−01 | −1.05756217E+00 | 1.63204991E−01 | −5.02261250E−02 |
| A8 = | 2.24990295E+00 | 5.67177056E+00 | −3.29010424E−01 | 1.21234728E−02 |
| A10 = | −9.39055008E+00 | −1.66774498E+01 | 3.51173475E−01 | 6.71217085E−03 |
| A12 = | 2.82092797E+01 | 3.20019568E+01 | −1.95559979E−01 | −6.45554181E−03 |
| A14 = | −6.00408446E+01 | −4.25983285E+01 | 8.94693595E−03 | 2.61764723E−03 |
| A16 = | 9.10775003E+01 | 4.05835964E+01 | 7.39730012E−02 | −6.59056403E−04 |
| A18 = | −9.92938381E+01 | −2.80962546E+01 | −6.24557928E−02 | 1.11421659E−04 |
| A20 = | 7.79478640E+01 | 1.41720287E+01 | 2.82597396E−02 | −1.28570608E−05 |
| A22 = | −4.36679603E+01 | −5.15613083E+00 | −8.15768390E−03 | 9.98298747E−07 |
| A24 = | 1.70304232E+01 | 1.31780339E+00 | 1.54585226E−03 | −4.97717392E−08 |
| A26 = | −4.39290571E+00 | −2.24413972E−01 | −1.86791321E−04 | 1.42879096E−09 |
| A28 = | 6.73645598E−01 | 2.28526333E−02 | 1.30801935E−05 | −1.72945024E−11 |
| A30 = | −4.64953135E−02 | −1.05208847E−03 | −4.04363080E−07 | −2.94659004E−14 |

TABLE 10-continued

| Aspheric Coefficients | | |
|---|---|---|
| Surface # | 15 | 16 |
| k = | −1.14122000E+00 | −1.05222000E+00 |
| A4 = | −3.29791418E−01 | −3.46131443E−01 |
| A6 = | 1.81764569E−01 | 1.85416723E−01 |
| A8 = | −8.53411283E−02 | −8.14844689E−02 |
| A10 = | 3.59878508E−02 | 2.86208830E−02 |
| A12 = | −1.23208105E−02 | −7.55100335E−03 |
| A14 = | 3.18870681E−03 | 1.45511251E−03 |
| A16 = | −6.11121498E−04 | −2.03646629E−04 |
| A18 = | 8.63585487E−05 | 2.06692279E−05 |
| A20 = | −8.94252390E−06 | −1.51178755E−06 |
| A22 = | 6.68434936E−07 | 7.83777510E−08 |
| A24 = | −3.50207391E−08 | −2.78691262E−09 |
| A26 = | 1.21778804E−09 | 6.39058591E−11 |
| A28 = | −2.52063258E−11 | −8.36210122E−13 |
| A30 = | 2.34784282E−13 | 4.59388141E−15 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.28 | (R1 + R2)/(R1 − R2) | −0.85 |
| Fno | 2.22 | (R10 + R11)/(R10 − R11) | −0.22 |
| HFOV [deg.] | 66.0 | R12/R14 | 2.12 |
| CT_MAX/f | 0.46 | (R9 + R13)/(R9 − R13) | 0.56 |
| CT3/T56 | 35.20 | (T12 + T23)/ΣAT | 0.58 |
| f/(CT1 + CT2) | 2.33 | (T12 + T23)/(T34 + T45 + T56 + T67) | 1.38 |
| f/CT2 | 8.09 | T23/T34 | 3.54 |
| CT5/T45 | 2.58 | TL/ImgH | 1.37 |
| f/CT7 | 6.00 | SL/f | 2.26 |
| f/f12 | −0.44 | V7/V4 | 1.92 |
| f/f56 | 0.33 | V1/N1 | 36.30 |
| f/f67 | −0.10 | V2/N2 | 14.34 |
| f/f1 | −0.38 | V3/N3 | 36.26 |
| f/f7 | 0.07 | V4/N4 | 11.65 |
| f/R3 | 0.90 | V5/N5 | 36.26 |
| f/(T12 + T23) | 2.68 | V6/N6 | 8.72 |
| (N2 + N4)/2 | 1.65 | V7/N7 | 23.91 |
| (N4 + N6)/2 | 1.70 | Y1R1/Y3R1 | 4.34 |
| (R1 + R13)/(R1 − R13) | 0.55 | — | — |

6th Embodiment

Figure 11:
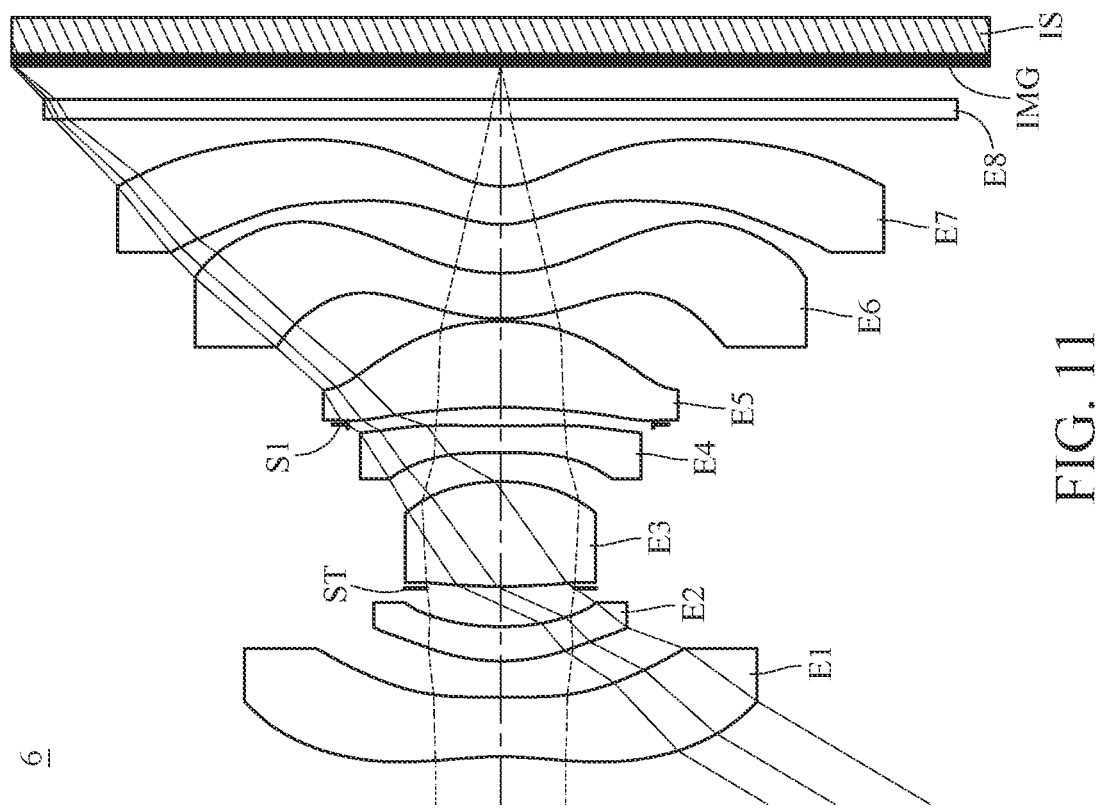
FIG. 11 is a schematic view of an image capturing unit according to the 6th embodiment of the present disclosure.
Figure 12:
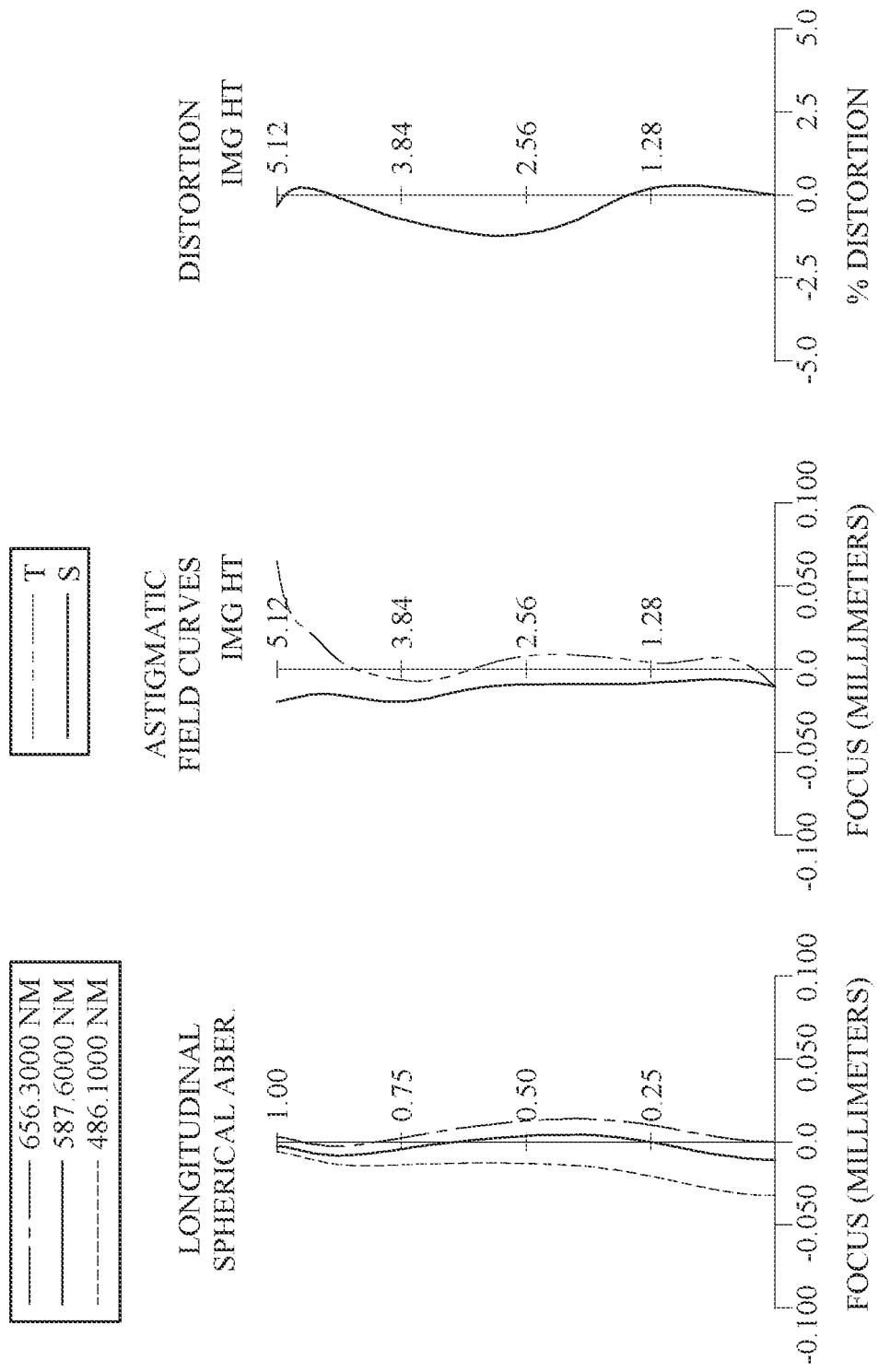
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical lens assembly (its reference numeral is omitted) of the present disclosure and an image sensor IS. The optical lens assembly includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The optical lens assembly includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points. The object-side surface of the first lens element E1 has one critical point in an off-axis region thereof. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of glass material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the optical lens assembly. The image sensor IS is disposed on or near the image surface IMG of the optical lens assembly.

The detailed optical data of the 6th embodiment are shown in Table 11 and the aspheric surface data are shown in Table 12 below.

TABLE 11

6th Embodiment
f = 3.05 mm, Fno = 2.23, HFOV = 59.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −3.6080 (ASP) | 0.625 | Plastic | 1.545 | 56.1 | −7.39 |
| 2 | | −36.8851 (ASP) | 0.380 | | | | |
| 3 | Lens 2 | 2.1810 (ASP) | 0.360 | Plastic | 1.614 | 25.6 | 16.40 |
| 4 | | 2.6091 (ASP) | 0.405 | | | | |
| 5 | Ape. Stop | Plano | 0.018 | | | | |
| 6 | Lens 3 | 6.4807 (ASP) | 1.102 | Plastic | 1.544 | 56.0 | 2.97 |
| 7 | | −2.0272 (ASP) | 0.306 | | | | |
| 8 | Lens 4 | −10.5569 (ASP) | 0.278 | Plastic | 1.680 | 18.2 | −8.25 |
| 9 | | 12.1049 (ASP) | 0.014 | | | | |
| 10 | Stop | Plano | 0.184 | | | | |
| 11 | Lens 5 | −5.1578 (ASP) | 0.901 | Glass | 1.517 | 52.1 | 8.39 |
| 12 | | −2.4978 (ASP) | 0.030 | | | | |
| 13 | Lens 6 | 2.0081 (ASP) | 0.476 | Plastic | 1.534 | 56.0 | 124.90 |
| 14 | | 1.8995 (ASP) | 0.514 | | | | |
| 15 | Lens 7 | 1.1371 (ASP) | 0.400 | Plastic | 1.529 | 45.4 | −17.56 |
| 16 | | 0.8898 (ASP) | 0.700 | | | | |
| 17 | Filter | Plano | 0.210 | Glass | 1.517 | 64.2 | — |
| 18 | | Plano | 0.354 | | | | |
| 19 | Image | Plano | — | | | | |

Note:
Reference wavelength is 587.6 nm (d-line).
An effective radius of the stop S1 (Surface 10) is 1.604 mm.

TABLE 12

Aspheric Coefficients

| Surface # | 1 | 2 | 3 | 4 |
|---|---|---|---|---|
| k = | −6.26305000E−01 | −3.03809000E+01 | −1.63345000E+00 | 7.86231000E−01 |
| A4 = | 1.36349682E−01 | 1.87425369E−01 | 6.96184108E−02 | 4.75543981E−02 |
| A6 = | −9.22215858E−02 | −1.59462410E−01 | −1.29030299E−01 | −1.21132084E−01 |
| A8 = | 6.65038643E−02 | 1.44766508E−01 | 1.45119321E−01 | 4.12814259E−01 |
| A10 = | −4.33866998E−02 | −1.34126852E−01 | −1.65465270E−01 | −9.62458097E−01 |
| A12 = | 2.35958365E−02 | 1.08568295E−01 | 1.13981507E−01 | 1.33500858E+00 |
| A14 = | −1.02074236E−02 | −6.93480205E−02 | −3.73016102E−02 | −9.72611940E−01 |
| A16 = | 3.42918267E−03 | 3.20373444E−02 | 4.56472645E−03 | 3.08538370E−01 |
| A18 = | −8.81231941E−04 | −9.25207060E−03 | — | — |
| A20 = | 1.70682053E−04 | 7.83431564E−04 | — | — |
| A22 = | −2.44107021E−05 | 5.82733110E−04 | — | — |
| A24 = | 2.49468895E−06 | −2.82885823E−04 | — | — |
| A26 = | −1.72111756E−07 | 6.09553763E−05 | — | — |
| A28 = | 7.17655536E−09 | −6.80714584E−06 | — | — |
| A30 = | −1.36533890E−10 | 3.18878071E−07 | — | — |

TABLE 12-continued

Aspheric Coefficients

| Surface # | 6 | 7 | 8 | 9 |
|---|---|---|---|---|
| k = | −3.88090000E+01 | −3.86800000E−01 | 1.45941000E+01 | 3.70734000E+00 |
| A4 = | 1.40006060E−02 | −7.86676644E−02 | −1.61658905E−01 | −7.11414202E−02 |
| A6 = | −2.92448437E−02 | 9.03092389E−03 | 1.15837563E−01 | 4.89926447E−02 |
| A8 = | 3.23285288E−02 | −1.62632972E−02 | −6.59689610E−01 | −2.21587826E−01 |
| A10 = | −6.76924737E−02 | 6.91907063E−02 | 2.48450803E+00 | 6.04571438E−01 |
| A12 = | 6.09728735E−02 | −1.57367955E−01 | −5.76777665E+00 | −1.00806647E+00 |
| A14 = | −7.01412052E−02 | 1.60218194E−01 | 9.30671211E+00 | 1.19680993E+00 |
| A16 = | 4.00645079E−02 | −8.18407301E−02 | −1.09105822E+01 | −1.07351094E+00 |
| A18 = | — | 1.62531142E−02 | 9.36777792E+00 | 7.31087249E−01 |
| A20 = | — | — | −5.81281492E+00 | −3.68067233E−01 |
| A22 = | — | — | 2.52441778E+00 | 1.31136960E−01 |
| A24 = | — | — | −7.24390220E−01 | −3.10274830E−02 |
| A26 = | — | — | 1.22996680E−01 | 4.35464231E−03 |
| A28 = | — | — | −9.33875398E−03 | −2.73736185E−04 |

| Surface # | 11 | 12 | 13 | 14 |
|---|---|---|---|---|
| k = | −1.38716000E+00 | −1.58521000E+00 | −8.50059000E−01 | −9.01549000E−01 |
| A4 = | 4.31760973E−02 | −1.08239524E−01 | −7.61424865E−02 | −2.46947500E−02 |
| A6 = | −1.63594171E−02 | 8.04282453E−02 | 7.24922090E−02 | 3.48304435E−02 |
| A8 = | 1.16336041E−01 | 9.81167764E−02 | −9.04086980E−02 | −6.79468432E−02 |
| A10 = | −5.50742515E−01 | −4.43348713E−01 | 5.41496614E−02 | 5.33877269E−02 |
| A12 = | 1.22011171E+00 | 7.51519228E−01 | −1.66864225E−02 | −2.52336823E−02 |
| A14 = | −1.69304596E+00 | −7.95173036E−01 | 9.85177802E−04 | 8.12078460E−03 |
| A16 = | 1.63503441E+00 | 5.81598340E−01 | 1.42661580E−03 | −1.87168547E−03 |
| A18 = | −1.14729046E+00 | −3.03887575E−01 | −6.93998150E−04 | 3.15200804E−04 |
| A20 = | 5.91857111E−01 | 1.14197518E−01 | 1.75337044E−04 | −3.88915397E−05 |
| A22 = | −2.22128578E−01 | −3.05744191E−02 | −2.83264466E−05 | 3.47715586E−06 |
| A24 = | 5.88235362E−02 | 5.68362554E−03 | 3.02574003E−06 | −2.19203370E−07 |
| A26 = | −1.03801756E−02 | −6.96946055E−04 | −2.07603955E−07 | 9.23819131E−09 |
| A28 = | 1.09210167E−03 | 5.07207296E−05 | 8.30400906E−09 | −2.33601395E−10 |
| A30 = | −5.17133956E−05 | −1.66121463E−06 | −1.47239410E−10 | 2.68049891E−12 |

| Surface # | 15 | 16 |
|---|---|---|
| k = | −1.13004000E+00 | −1.10018000E+00 |
| A4 = | −3.12919814E−01 | −3.62696136E−01 |
| A6 = | 1.31577019E−01 | 2.06462849E−01 |
| A8 = | −3.03721757E−02 | −9.02012415E−02 |
| A10 = | 8.33765608E−04 | 2.96445283E−02 |
| A12 = | 2.38122628E−03 | −7.20187259E−03 |
| A14 = | −1.04145710E−03 | 1.29169798E−03 |
| A16 = | 2.49605484E−04 | −1.71657354E−04 |
| A18 = | −3.92262532E−05 | 1.69247987E−05 |
| A20 = | 4.22947649E−06 | −1.23201123E−06 |
| A22 = | −3.15100248E−07 | 6.52610623E−08 |
| A24 = | 1.59285782E−08 | −2.44342040E−09 |
| A26 = | −5.20196640E−10 | 6.12259746E−11 |
| A28 = | 9.85731279E−12 | −9.20410701E−13 |
| A30 = | −8.17590930E−14 | 6.27075278E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.05 | (R1 + R2)/(R1 − R2) | −1.22 |
| Fno | 2.23 | (R10 + R11)/(R10 − R11) | 0.11 |
| HFOV [deg.] | 59.2 | R12/R14 | 2.13 |
| CT_MAX/f | 0.36 | (R9 + R13)/(R9 − R13) | 0.64 |
| CT3/T56 | 36.73 | (T12 + T23)/ΣAT | 0.43 |
| f/(CT1 + CT2) | 3.10 | (T12 + T23)/(T34 + T45 + T56 + T67) | 0.77 |
| f/CT2 | 8.48 | T23/T34 | 1.38 |
| CT5/T45 | 4.55 | TL/ImgH | 1.42 |
| f/CT7 | 7.63 | SL/f | 1.80 |
| f/f12 | −0.23 | V7/V4 | 2.50 |
| f/f56 | 0.42 | V1/N1 | 36.30 |
| f/f67 | −0.13 | V2/N2 | 15.85 |
| f/f1 | −0.41 | V3/N3 | 36.26 |
| f/f7 | −0.17 | V4/N4 | 10.81 |
| f/R3 | 1.40 | V5/N5 | 34.37 |
| f/(T12 + T23) | 3.80 | V6/N6 | 36.48 |
| (N2 + N4)/2 | 1.65 | V7/N7 | 29.68 |
| (N4 + N6)/2 | 1.61 | Y1R1/Y3R1 | 3.41 |
| (R1 + R13)/(R1 − R13) | 0.52 | — | — |

7th Embodiment

Figure 13:
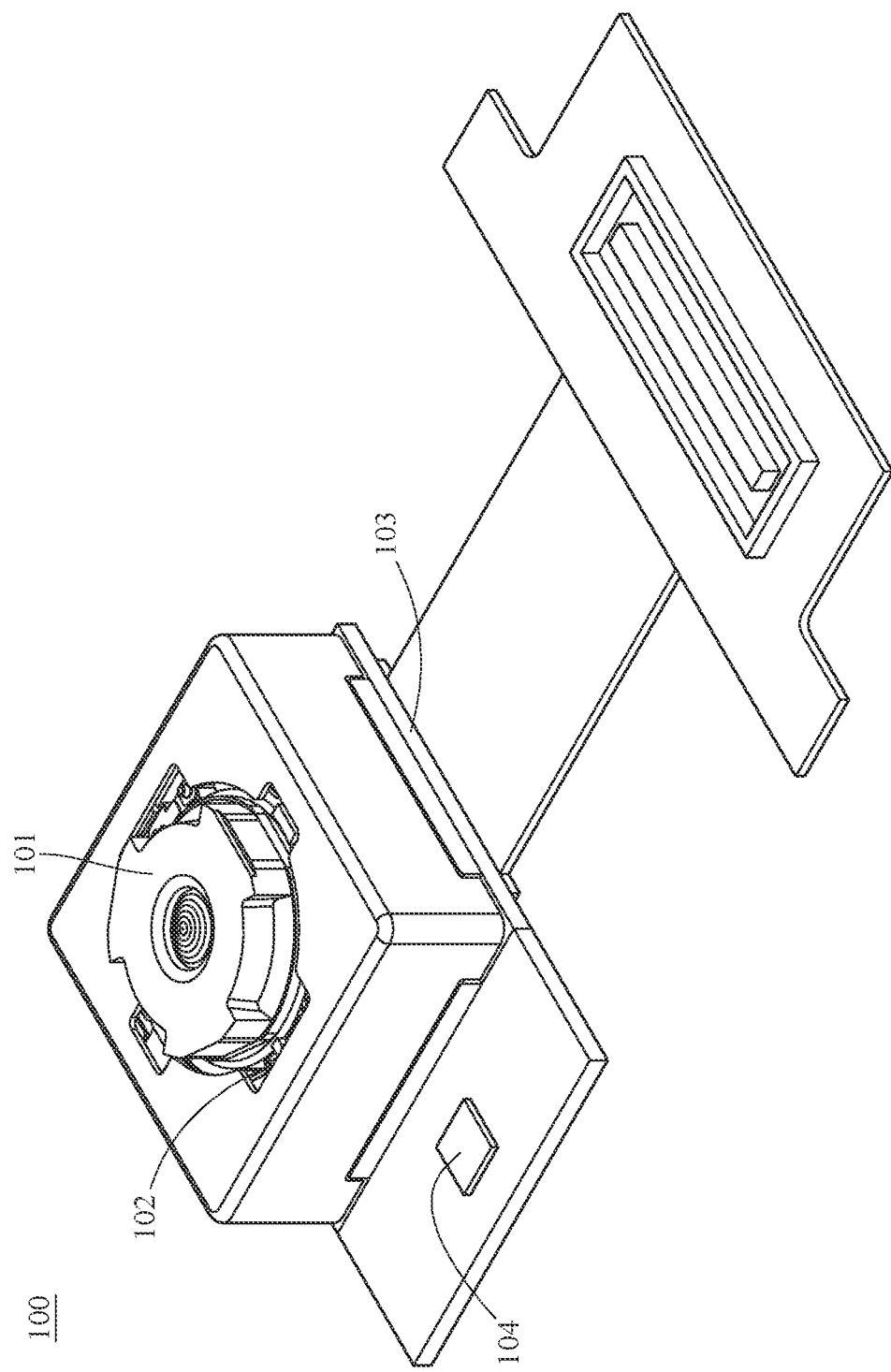
FIG. 13 is a perspective view of an image capturing unit according to the 7th embodiment of the present disclosure.

FIG. 13 is a perspective view of an image capturing unit according to the 7th embodiment of the present disclosure. In this embodiment, an image capturing unit 100 is a camera module including a lens unit 101, a driving device 102, an image sensor 103 and an image stabilizer 104. The lens unit 101 includes the optical lens assembly disclosed in the 1st embodiment, a barrel and a holder member (their reference numerals are omitted) for holding the optical lens assembly. However, the lens unit 101 may alternatively be provided with the optical lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

8th Embodiment

Figure 14:
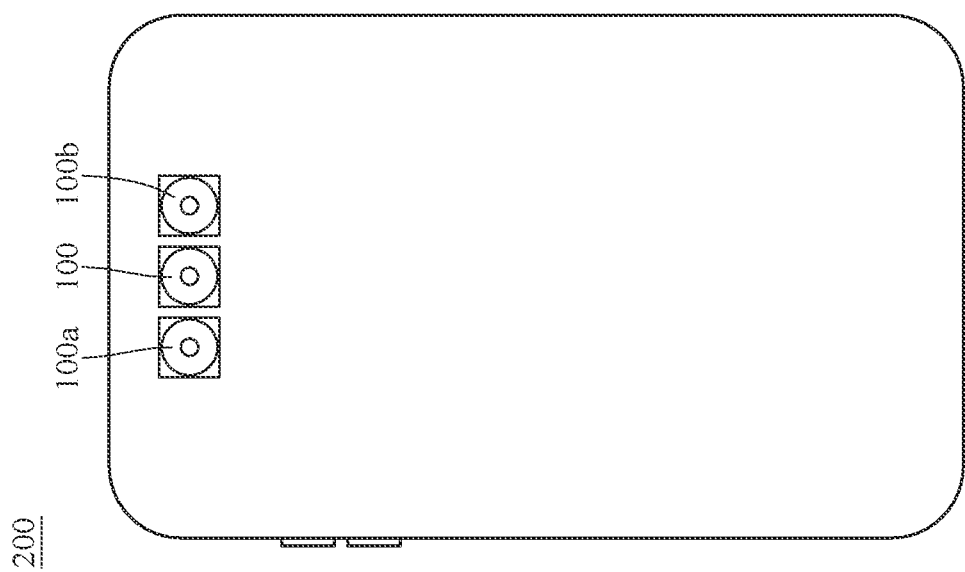
FIG. 14 is one perspective view of an electronic device according to the 8th embodiment of the present disclosure.
Figure 15:
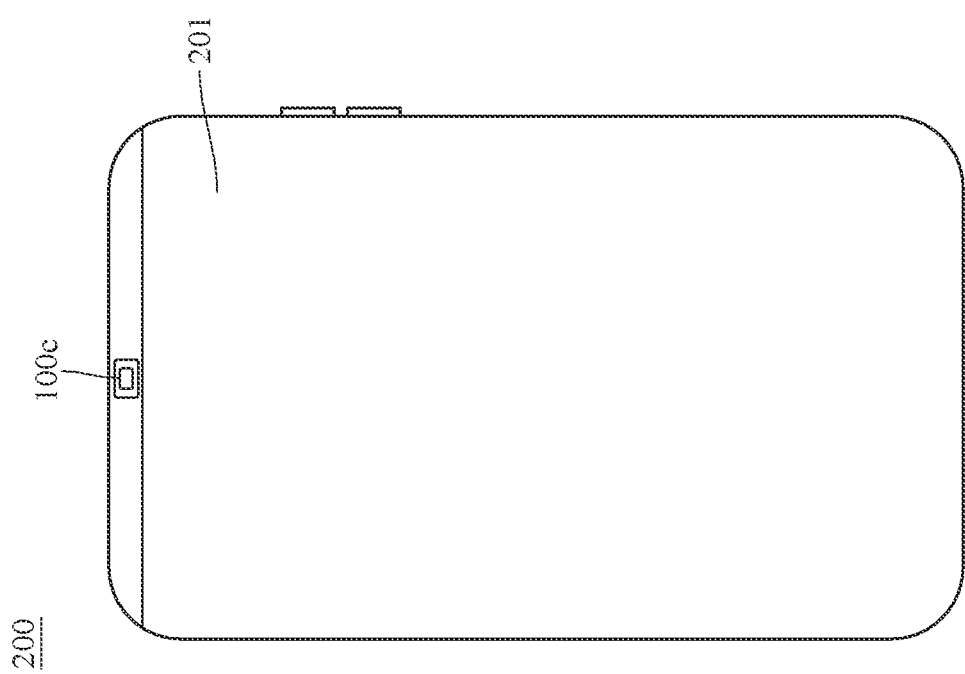
FIG. 15 is another perspective view of the electronic device in FIG. 14.

FIG. 14 is one perspective view of an electronic device according to the 8th embodiment of the present disclosure. FIG. 15 is another perspective view of the electronic device in FIG. 14.

In this embodiment, an electronic device 200 is a smartphone including the image capturing unit 100 disclosed in the 7th embodiment, an image capturing unit 100a, an image capturing unit 100b, an image capturing unit 100c and a display unit 201. As shown in FIG. 14, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 15, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the optical lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an optical lens assembly such as the optical lens assembly of the present disclosure, a barrel and a holder member for holding the optical lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 15, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

9th Embodiment

Figure 16:
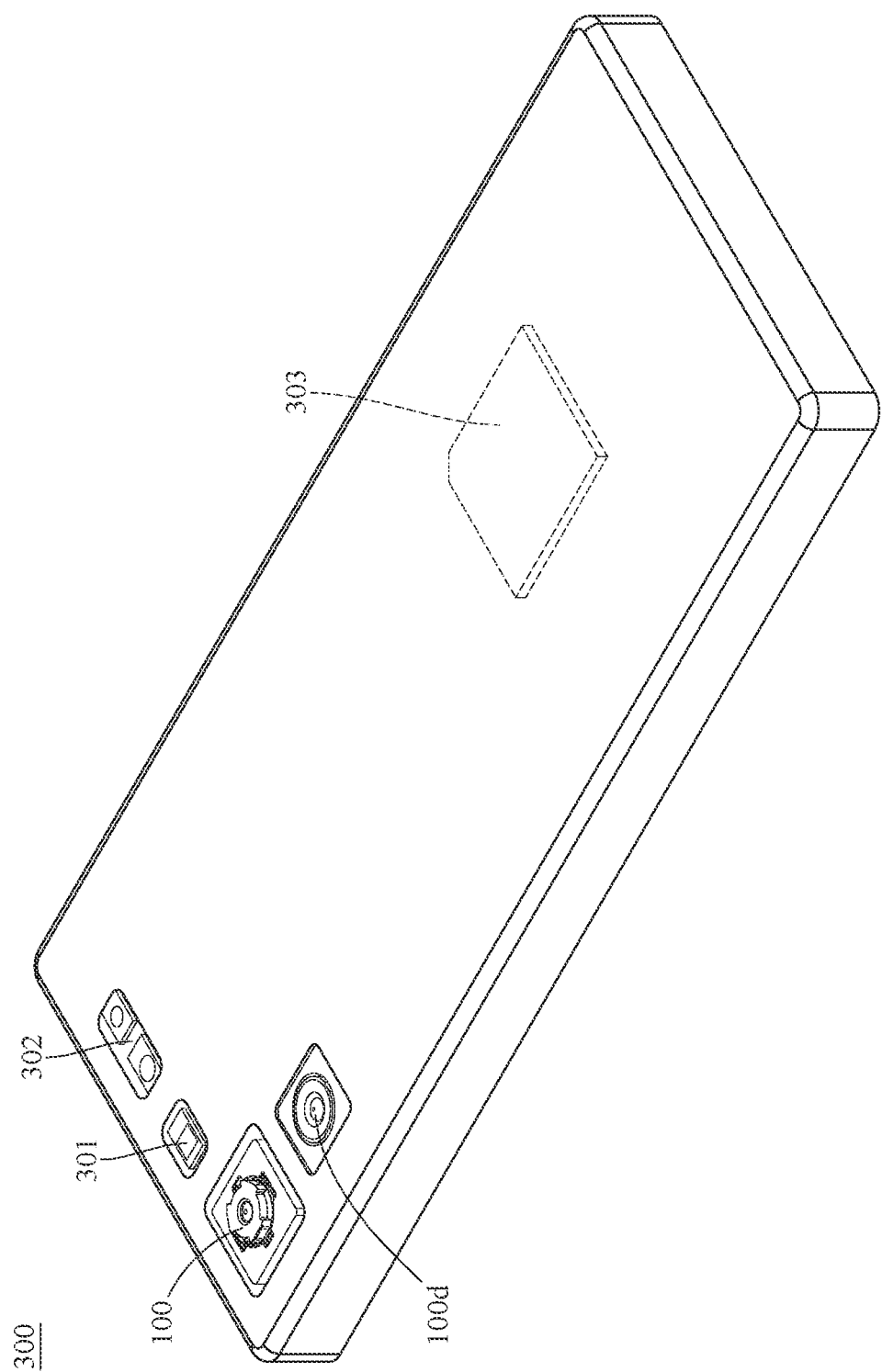
FIG. 16 is one perspective view of an electronic device according to the 9th embodiment of the present disclosure.
Figure 17:
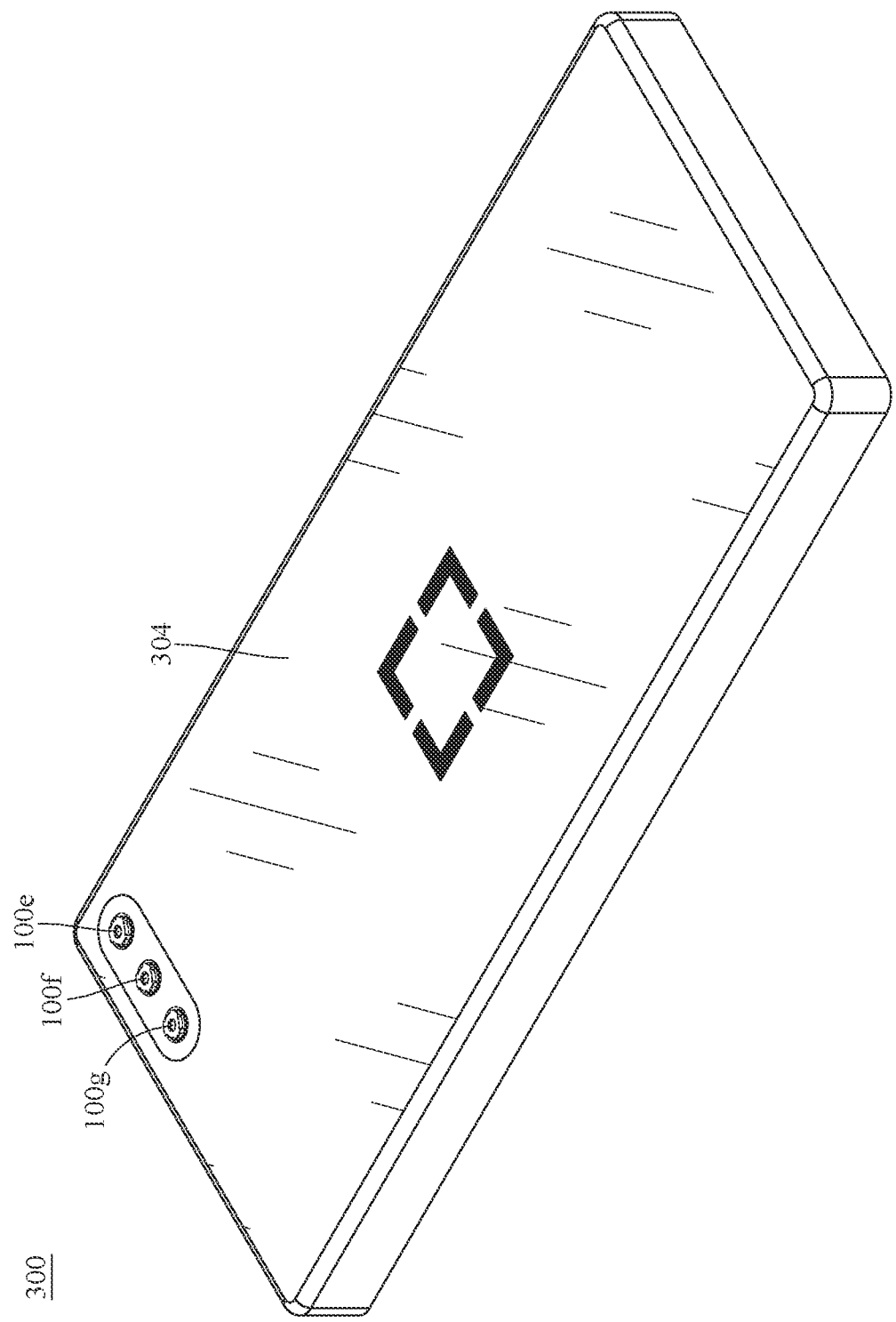
FIG. 17 is another perspective view of the electronic device in FIG. 16.
Figure 18:
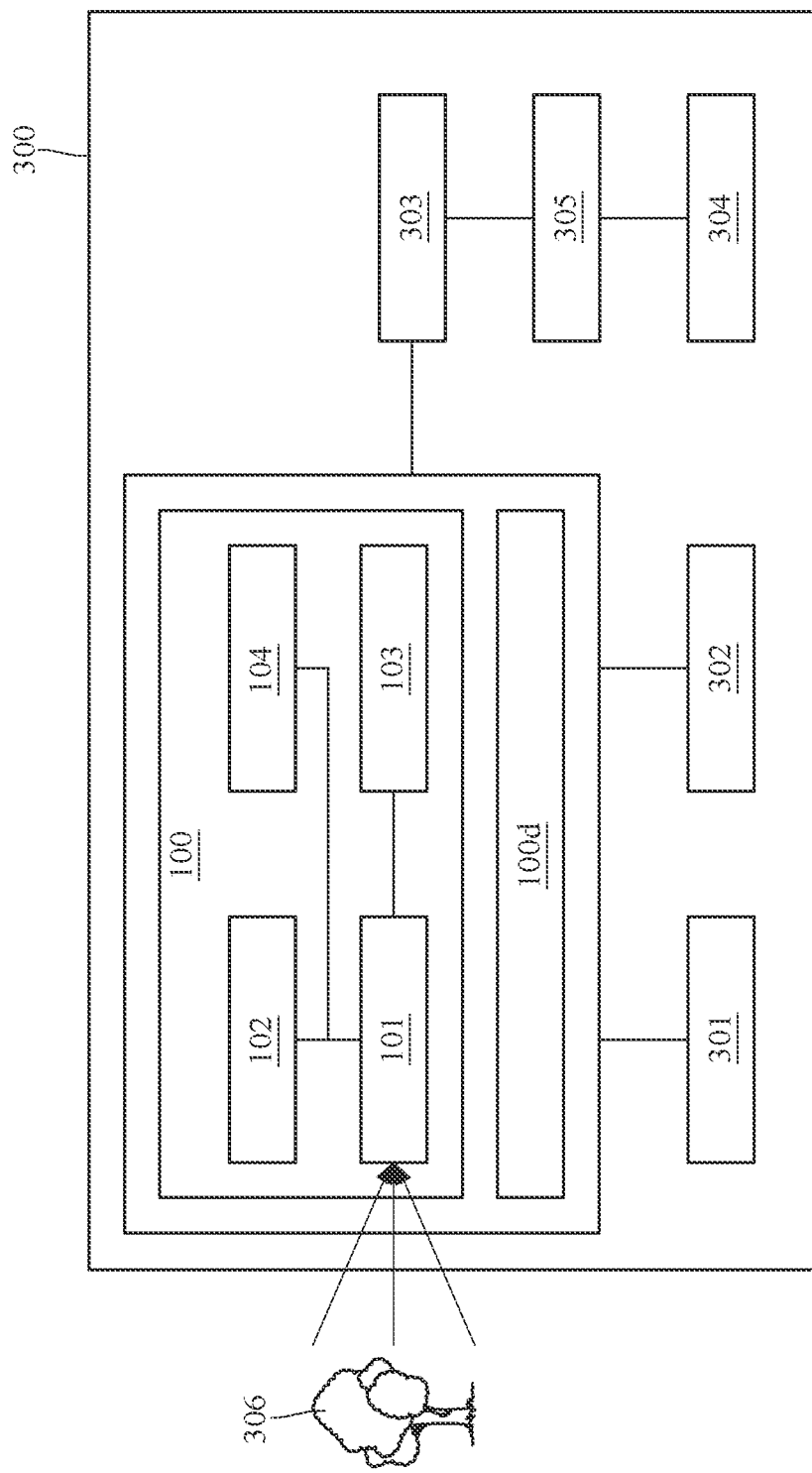
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 300 is a smartphone including the image capturing unit 100 disclosed in the 7th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the optical lens assembly of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an optical lens assembly such as the optical lens assembly of the present disclosure, a barrel and a holder member for holding the optical lens assembly.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100, 100d, 100e and 100f have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

10th Embodiment

Figure 19:
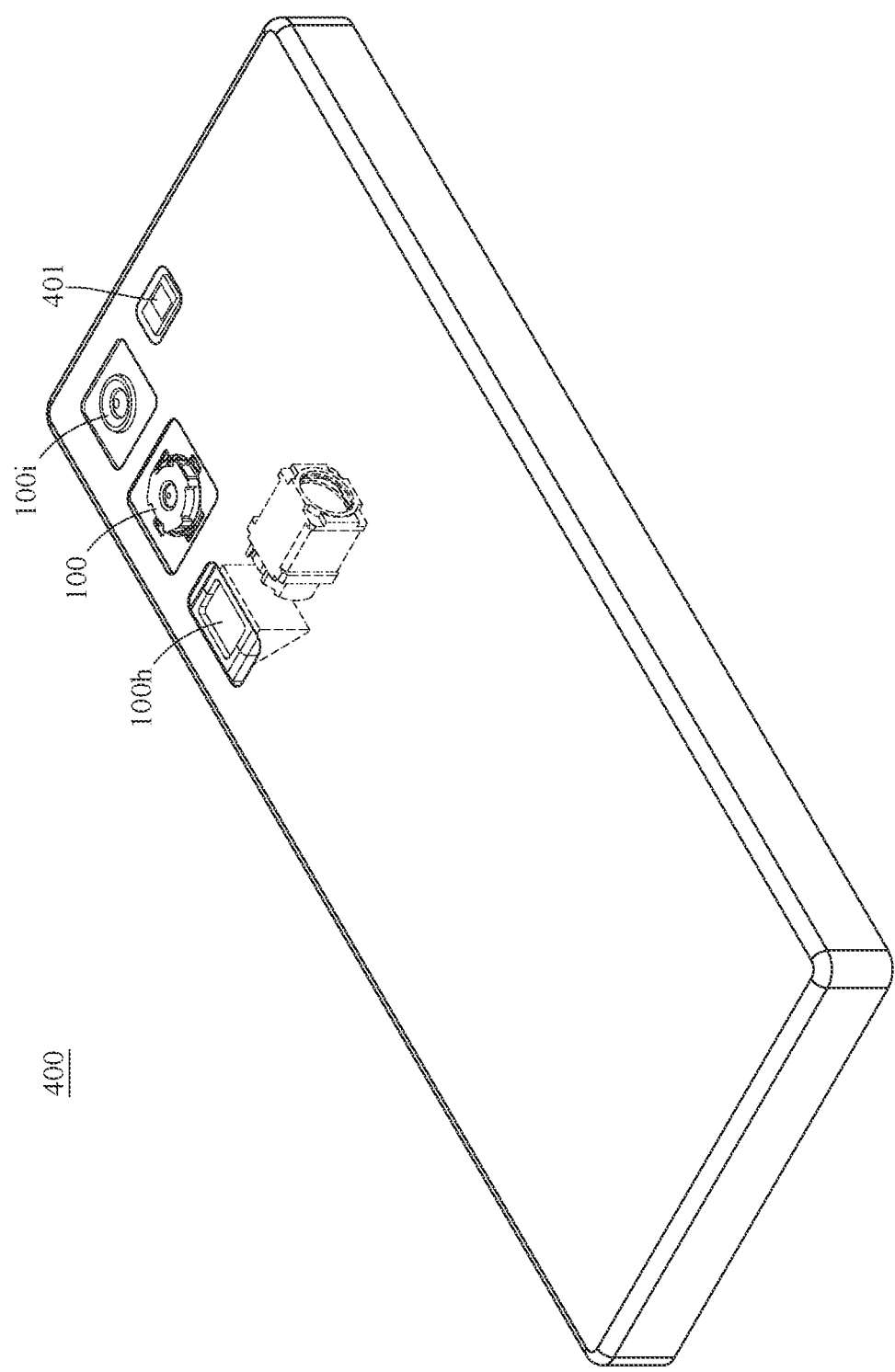
FIG. 19 is one perspective view of an electronic device according to the 10th embodiment of the present disclosure.

FIG. 19 is one perspective view of an electronic device according to the 10th embodiment of the present disclosure.

In this embodiment, an electronic device 400 is a smartphone including the image capturing unit 100 disclosed in the 7th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the optical lens assembly of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 22 to FIG. 24, which can be referred to foregoing descriptions corresponding to FIG. 22 to FIG. 24, and the details in this regard will not be provided again. In this embodiment, the electronic device 400 includes multiple image capturing units 100, 100h and 100i, but the present disclosure is not limited to the number and arrangement of image capturing units. When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

11th Embodiment

Figure 20:
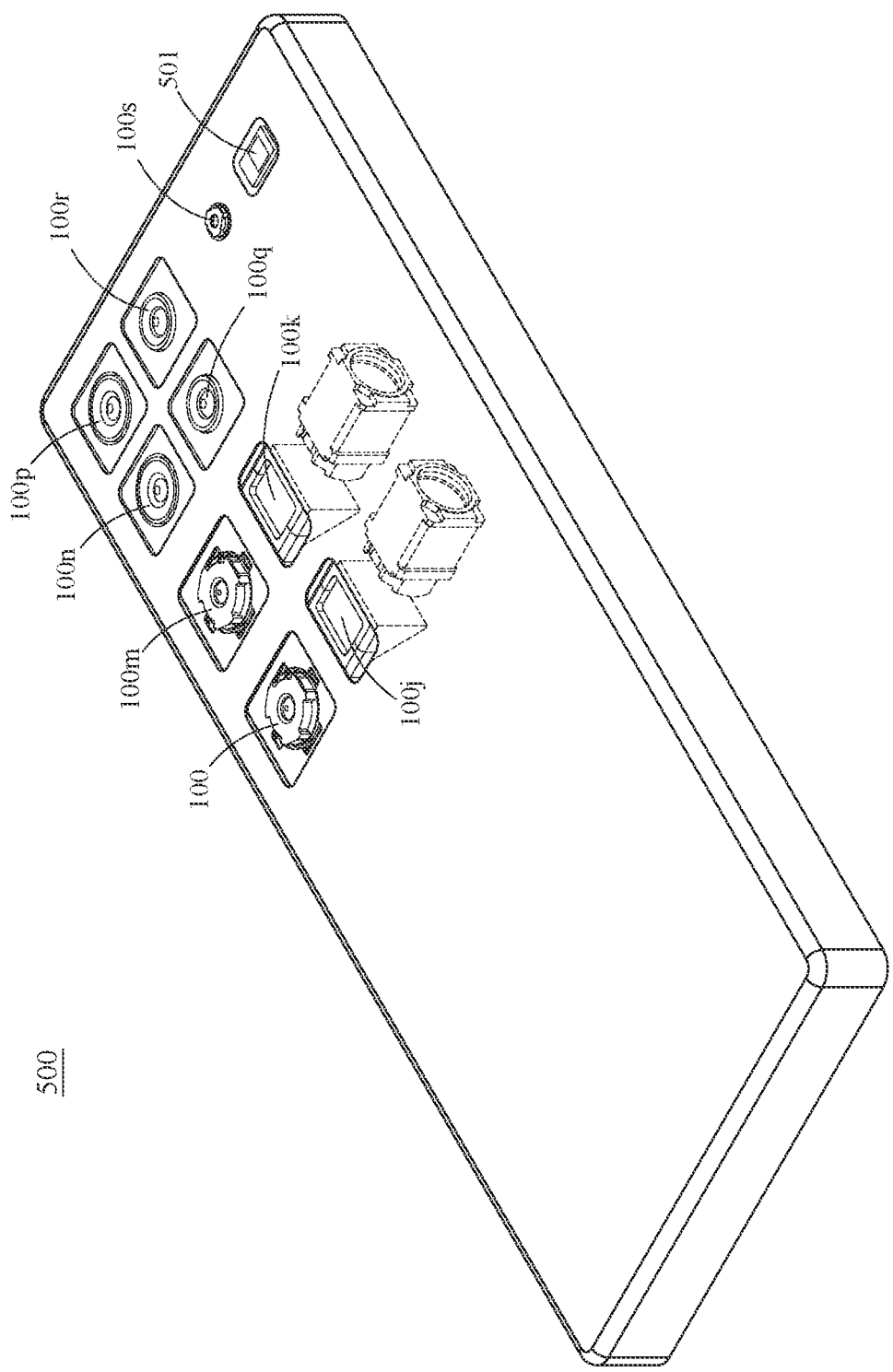
FIG. 20 is one perspective view of an electronic device according to the 11th embodiment of the present disclosure.

FIG. 20 is one perspective view of an electronic device according to the 11th embodiment of the present disclosure.

In this embodiment, an electronic device 500 is a smartphone including the image capturing unit 100 disclosed in the 7th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the optical lens assembly of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 22 to FIG. 24, which can be referred to foregoing descriptions corresponding to FIG. 22 to FIG. 24, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein a total number of lens elements of the optical lens assembly is seven, the first lens element has negative refractive power, the object-side surface of the first lens element is concave in a paraxial region thereof, the object-side surface of the second lens element is convex in a paraxial region thereof, the third lens element has positive refractive power, the object-side surface of the sixth lens element is convex in a paraxial region thereof, the image-side surface of the sixth lens element is concave in a paraxial region thereof, the object-side surface of the seventh lens element is convex in a paraxial region thereof, the image-side surface of the seventh lens element is concave in a paraxial region thereof, and the image-side surface of the seventh lens element has at least one inflection point;

wherein a curvature radius of the object-side surface of the first lens element is R1, a curvature radius of the image-side surface of the first lens element is R2, a curvature radius of the object-side surface of the second lens element is R3, a focal length of the optical lens assembly is f, a focal length of the first lens element is f1, a focal length of the seventh lens element is f7, a central thickness of the fifth lens element is CT5, an axial distance between the fourth lens element and the fifth lens element is T45, an axial distance between the object-side surface of the first lens element and an image surface is TL, a maximum image height of the optical lens assembly is ImgH, and the following conditions are satisfied:

$-2.50<(R1+R2)/(R1-R2)<-0.10;$ $-0.50<f/f7<0.60;$ $0.50<CT5/T45<7.50;$ $-3.00<f/f1<-0.10;$ $0.50<f/R3<1.90;$ and $TL/ImgH<2.00.$ 2. The optical lens assembly of claim 1, wherein the object-side surface of the first lens element has at least one inflection point, a maximum value among central thicknesses of all lens elements of the optical lens assembly is CT_MAX, the focal length of the optical lens assembly is f, and the following condition is satisfied:

$0.30<CT\_MAX/f<0.50.$

3. The optical lens assembly of claim 1, wherein the focal length of the optical lens assembly is f, a composite focal length of the first lens element and the second lens element is f12, and the following condition is satisfied:

$-0.49<f/f12<-0.10.$

4. The optical lens assembly of claim 1, wherein a curvature radius of the image-side surface of the fifth lens element is R10, a curvature radius of the object-side surface of the sixth lens element is R11, and the following condition is satisfied:

$-0.85<(R10+R11)/(R10-R11)<1.25.$

5. The optical lens assembly of claim 1, wherein a refractive index of the fourth lens element is N4, a refractive index of the sixth lens element is N6, and the following condition is satisfied:

$1.60<(N4+N6)/2<1.85.$

6. The optical lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least one lens element of the optical lens assembly satisfying the following condition:

$5.0<Vi/Ni<11.9,$ wherein $i=1,2,3,4,5,6$ or $7.$

7. The optical lens assembly of claim 1, wherein the fifth lens element has positive refractive power, wherein a curvature radius of the image-side surface of the fifth lens element is R10, a curvature radius of the object-side surface of the sixth lens element is R11, and the following condition is satisfied:

$-0.40<(R10+R11)/(R10-R11)<0.80.$

8. The optical lens assembly of claim 1, wherein a curvature radius of the object-side surface of the fifth lens element is R9, a curvature radius of the object-side surface of the seventh lens element is R13, and the following condition is satisfied:

$0.03 < (R9+R13)/(R9-R13)$.

9. The optical lens assembly of claim 1, wherein an axial distance between the second lens element and the third lens element is T23, an axial distance between the third lens element and the fourth lens element is T34, and the following condition is satisfied:

$1.03 < T23/T34 < 4.60$.

10. The optical lens assembly of claim 1, wherein the focal length of the optical lens assembly is f, a composite focal length of the fifth lens element and the sixth lens element is f56, and the following condition is satisfied:

$-1.50 < f/f56 < 0.68$.

* * * * *